(12) United States Patent
Morita

(10) Patent No.: US 12,202,419 B2
(45) Date of Patent: Jan. 21, 2025

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 18/139,995

(22) Filed: Apr. 27, 2023

(65) Prior Publication Data

US 2024/0010142 A1    Jan. 11, 2024

Related U.S. Application Data

(63) Continuation of application No. PCT/JP2021/037132, filed on Oct. 7, 2021.

(30) Foreign Application Priority Data

Oct. 27, 2020    (JP) .................................. 2020-180040

(51) Int. Cl.

| | |
|---|---|
| *B60L 1/00* | (2006.01) |
| *B60L 3/00* | (2019.01) |
| *B60L 58/20* | (2019.01) |
| *B60R 16/033* | (2006.01) |
| *H01M 10/44* | (2006.01) |
| *H01M 10/48* | (2006.01) |
| *H02J 7/00* | (2006.01) |

(Continued)

(52) U.S. Cl.
CPC .......... *B60R 16/033* (2013.01); *H01M 10/44* (2013.01); *H01M 10/48* (2013.01); *H02J 7/34* (2013.01); *H02J 9/068* (2020.01); *H01M 2220/20* (2013.01)

(58) Field of Classification Search
CPC ...... B60R 16/033; B60R 16/03; H01M 10/44; H01M 10/48; H01M 2220/20; H02J 7/34; H02J 9/068; H02J 7/00; H02J 9/061; H02J 2310/40; H02J 7/0047; H02J 7/1423; H02J 7/0063; Y02E 60/10; Y02T 10/70; Y02T 10/92; B60L 1/00; B60L 3/00; B60L 58/20; B60L 58/10
USPC ..... 307/9.1, 10.1, 48, 64; 320/104, 136, 140
See application file for complete search history.

(56) References Cited

U.S. PATENT DOCUMENTS

| | | | |
|---|---|---|---|
| 2012/0019190 A1* | 1/2012 | Jones ........................ | H02J 7/34 |
| | | | 320/101 |
| 2018/0172770 A1* | 6/2018 | Sun ........................ | B60L 58/10 |

(Continued)

*Primary Examiner* — Elim Ortiz
(74) *Attorney, Agent, or Firm* — Oliff PLC

(57) ABSTRACT

A power supply system includes: a first system having a first power supply; a second system having a second power supply; and an inter-system switch provided in a connection path connecting the first and second systems. First and second paths are provided in parallel between a connection point, at which the connection path is connected with the second system, and the second power supply. The power supply system further includes: a charging unit provided in the first path to charge, with the inter-system switch closed, a storage battery of the second power supply; a discharge restriction unit provided in the second path to restrict discharge of the storage battery; an abnormality determination unit that determines whether an abnormality has occurred in the discharge restriction unit; and a use restriction unit that restricts use of the second power supply upon determination that an abnormality has occurred in the discharge restriction unit.

8 Claims, 11 Drawing Sheets

(51) Int. Cl.
*H02J 7/34* (2006.01)
*H02J 9/06* (2006.01)

(56) References Cited

U.S. PATENT DOCUMENTS

| | | | |
|---|---|---|---|
| 2020/0216002 A1 | 7/2020 | Mazaki et al. | |
| 2020/0262308 A1* | 8/2020 | Sasahara | B60L 50/64 |
| 2020/0313457 A1* | 10/2020 | Kozuki | H02J 7/0068 |
| 2021/0242712 A1* | 8/2021 | Izawa | B60R 16/033 |

* cited by examiner

POWER SUPPLY SYSTEM

CROSS-REFERENCE TO RELATED APPLICATIONS

The present application is a continuation application of International Application No. PCT/JP2021/037132 filed on Oct. 7, 2021, which is based on and claims priority from Japanese Patent Application No. 2020-180040 filed on Oct. 27, 2020. The entire contents of these applications are incorporated by reference into the present application.

BACKGROUND

1 Technical Field

The present disclosure relates to power supply systems.

2 Description of Related Art

In recent years, power supply systems have been known which are applied to, for example, vehicles to supply electric power to various devices in the vehicles. In these power supply systems, when an abnormality occurs, during driving of the vehicle, in a system that supplies electric power to electrical loads that perform functions necessary for the driving of the vehicle, such as an electric brake device and an electric steering device, and the functions of the electrical loads are lost due to the abnormality, the driving of the vehicle cannot be continued. Moreover, apparatuses have been known which include both a first power supply and a second power supply for supplying electric power to the electrical loads, so as to prevent the functions of the electrical loads from being lost even when an abnormality occurs during the driving of the vehicle.

SUMMARY

According to the present disclosure, there is provided a power supply system which includes: a first system that supplies electric power from a first power supply to electrical loads via a first conduction path; a second system that supplies electric power from a second power supply to the electrical loads via a second conduction path; and an inter-system switch provided in a connection path that connects the first and second conduction paths with each other. The first power supply outputs a power supply voltage by which it is possible to drive the electrical loads. The second power supply includes a storage battery chargeable by the power supply voltage of the first power supply. A first path and a second path are provided in parallel with each other between a connection point, at which the connection path is connected with the second conduction path, and the second power supply. The power supply system further includes: a switching control unit that switches the power supply system between a first state in which the inter-system switch is closed and a second state in which the inter-system switch is open; a charging unit provided in the first path to charge, in the first state of the power supply system, the storage battery to a voltage higher than the power supply voltage of the first power supply with electric power supplied from the first power supply; a discharge restriction unit provided in the second path to restrict discharge of the storage battery in the second system; an abnormality determination unit that determines whether an abnormality has occurred in the discharge restriction unit; and a use restriction unit that restricts use of the second power supply when it is determined by the abnormality determination unit that an abnormality has occurred in the discharge restriction unit.

DESCRIPTION OF EMBODIMENTS

Figure 1:
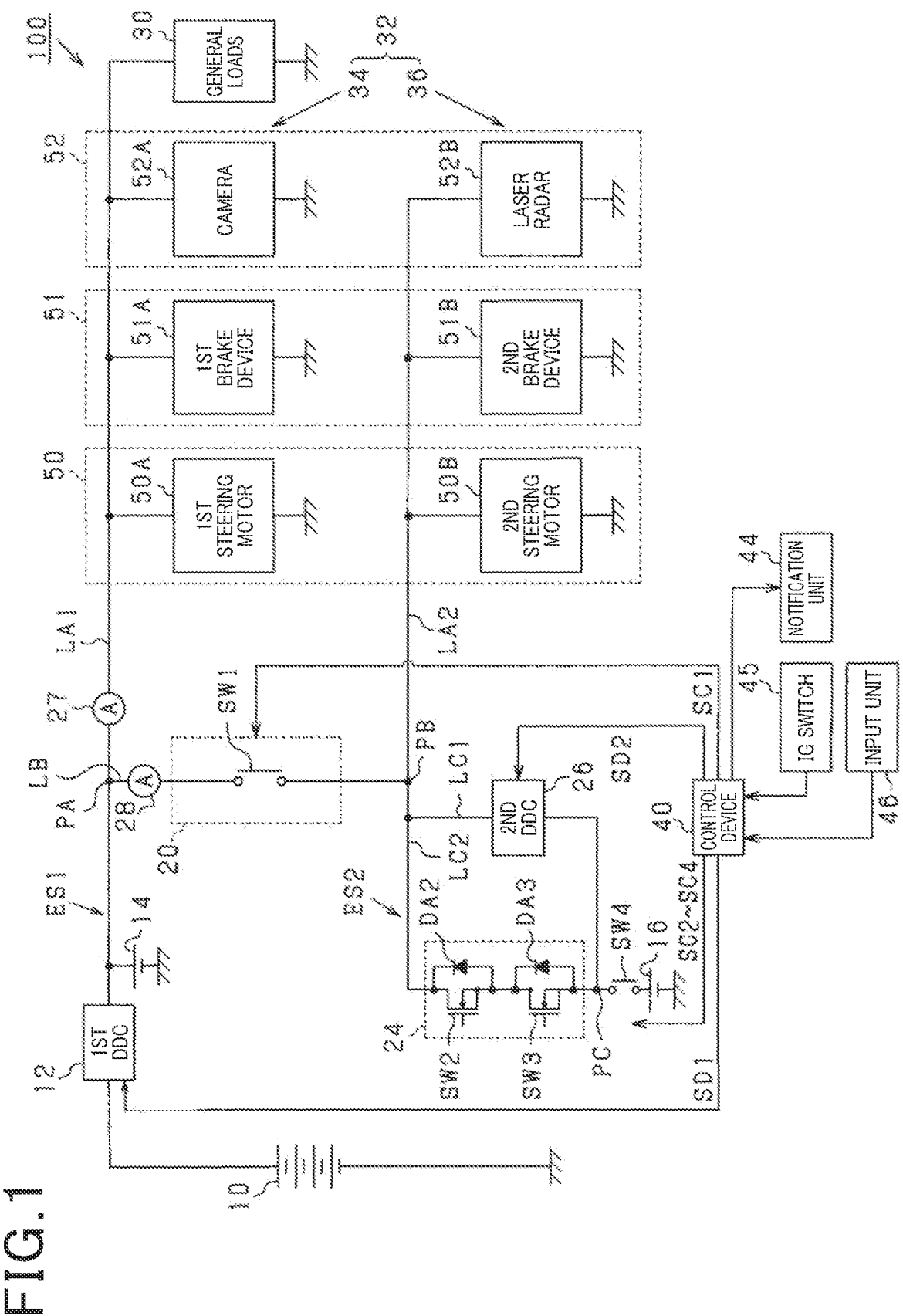
FIG. 1 is an overall configuration diagram of a power supply system according to a first embodiment.

For example, Japanese Patent Application Publication No. JP2019062727A discloses a power supply system that has: both a first load and a second load as electrical loads for performing a function necessary for the driving of a vehicle; and both a first system including a first power supply connected with the first load and a second system including a second power supply connected with the second load. Moreover, in the power supply system, an inter-system switch is provided in a connection path that connects the first and second systems with each other. When it is determined by a controller that an abnormality has occurred in one of the first and second systems, the inter-system switch is opened. Consequently, it becomes possible to secure, by the electrical load of the other of the first and second systems where no abnormality has occurred, the function necessary for the driving of the vehicle, thereby making it possible to continue the driving of the vehicle.

Moreover, in the power supply system disclosed in the above patent document, the second power supply of the second system may be configured with a storage battery. With such a configuration, when a power failure occurs in the first system, if the storage battery (i.e., the second power supply) has been charged with electric power supplied from the first power supply of the first system, it will be possible to drive the electrical loads with electric power stored in the storage battery. In this case, to use the storage battery as desired, it is desirable to properly charge and discharge the storage battery; and it is considered that there is room for technical improvement in this regard.

The present disclosure has been accomplished in view of the above circumstances.

In the above-described power supply system according to the present disclosure, there are provided both the first system that supplies electric power from the first power supply to the electrical loads via the first conduction path and the second system that supplies electric power from the second power supply to the electrical loads via the second conduction path. Consequently, with the first and second power supplies, it becomes possible to secure redundancy of electric power supply to the electrical loads. Moreover, there is provided the inter-system switch in the connection path that connects the first and second conduction paths with each other. Consequently, when it is determined that an abnormality has occurred in one of the two systems, it is possible to continue, by switching the power supply system to the second state in which the inter-system switch is open, the operations of the electrical loads with electric power supplied from the power supply of the other of the two systems which has no abnormality occurring therein.

Moreover, when the voltage required for driving the electrical loads becomes high under a low-temperature or/and high-load condition, if the storage battery of the second power supply has been charged to a voltage higher than the power supply voltage of the first power supply with electric power supplied from the first power supply, it will be possible to properly drive the electrical loads with electric power stored in the storage battery. In this case, it is desirable to restrict unnecessary discharge from the storage battery while charging the storage battery at a voltage higher than the power supply voltage. In view of the above, the first and second paths are provided in parallel with each other between the connection point, at which the connection path is connected with the second conduction path, and the second power supply. Further, in the first path, there is provided the charging unit by which the storage battery is charged, in the first state of the power supply system in which the inter-system switch is closed, at a voltage higher than the power supply voltage of the first power supply with electric power supplied from the first power supply. On the other hand, in the second path, there is provided the discharge restriction unit by which unnecessary discharge from the storage battery is restricted. However, if an abnormality has occurred in the discharge restriction unit, during charging of the storage battery, despite the fact that the voltage of the storage battery cannot be sufficiently increased due to discharge from the storage battery, supply of electric power to the storage battery is continued, resulting in an increase in the electric power consumption of the power supply system. Consequently, it may become impossible to properly perform charging/discharging of the storage battery.

In this regard, in the power supply system according to the present disclosure, it is determined by the abnormality determination unit whether an abnormality has occurred in the discharge restriction unit; and when it is determined that an abnormality has occurred in the discharge restriction unit, the use of the second power supply is restricted by the use restriction unit. Consequently, when an abnormality has occurred in the discharge restriction unit, supply of electric power to the storage battery is suppressed. As a result, it becomes possible to suppress useless charging/discharging of the storage battery, thereby suppressing electric power consumption of the power supply system; thus, it becomes possible to properly perform charging/discharging of the storage battery.

In further implementations, the charging unit may be configured to perform a boosting operation for boosting the power supply voltage of the first power supply. The abnormality determination unit may be configured to acquire, during the boosting operation of the charging unit, a voltage difference between a voltage at a branch point between the first and second paths on the second power supply side and a voltage at the connection point and determine, based on the acquired voltage difference, whether an abnormality has occurred in the discharge restriction unit.

To determine whether an abnormality has occurred in the discharge restriction unit, it is preferable to generate a predetermined voltage difference between the voltage at the branch point and the voltage at the connection point. In this regard, with the above configuration, the voltage difference can be generated by the boosting operation of the charging unit; and it is possible to determine, based on the voltage difference, whether an abnormality has occurred in the discharge restriction unit. Consequently, by properly controlling the charging, it becomes possible to determine whether an abnormality has occurred in the discharge restriction unit without employing any additional configuration for generating the voltage difference between the voltage at the branch point and the voltage at the connection point. As a result, it becomes possible to simplify the configuration of the entire power supply system.

Further, the discharge restriction unit may include a battery switch for selectively opening and closing the second path. The switching control unit may be configured to control the opening and closing of the battery switch. In this case, during the boosting operation of the charging unit, when the voltage difference is smaller than a predetermined first threshold with the battery switch being controlled so as to be opened or when the voltage difference is larger than a predetermined second threshold with the battery switch being controlled so as to be closed, the abnormality determination unit may determine that an abnormality has occurred in the discharge restriction unit.

With the above configuration, it is possible to determine occurrence of a stuck-closed abnormality in which the battery switch is stuck closed and occurrence of a stuck-open abnormality in which the battery switch is stuck open.

Alternatively, the discharge restriction unit may include a rectifying element that restricts flow of electric current from the connection point to the storage battery in the second path and causes a predetermined reference voltage difference between a voltage of the storage battery and the power supply voltage. The power supply system may further include a boosting control unit capable of adjusting a boosting amount of the charging unit up to a value larger than a corresponding value that corresponds to the reference voltage difference. In this case, when electric current flows through the rectifying element with the boosting amount being smaller than the corresponding value or when no electric current flows through the rectifying element with the boosting amount being larger than the corresponding value, the abnormality determination unit may determine that an abnormality has occurred in the discharge restriction unit.

With the above configuration, it is possible to determine whether an abnormality accompanied with fluctuations in the reference voltage difference has occurred in the rectifying element.

Further, the abnormality determination unit may be configured to acquire variation information indicating the degree of variation in the boosting amount and vary the corresponding value according to the acquired variation information.

When the optimal value of the boosting amount of the charging unit changes depending on the temperature of the storage battery, variation is caused in the boosting amount by the temperature characteristic of the storage battery. In this regard, with the above configuration, it is possible to properly determine, using the corresponding value that corresponds to the degree of variation in the boosting amount, whether an abnormality has occurred the discharge restriction unit.

The power supply system according to the present disclosure may further include an intra-system switch that is provided, in the second conduction path, between the second power supply and a branch point between the first and second paths on the second power supply side. The abnormality determination unit may be configured to determine, with the intra-system switch being in an open state, whether an abnormality has occurred in the discharge restriction unit.

In determining abnormalities in the discharge restriction unit, if the voltage of the storage battery is different from the voltage at the branch point (i.e., the voltage resulting from the boosting operation of the charging unit), abnormalities in the discharge restriction unit cannot be properly determined due to the influence of the voltage of the storage battery. In this regard, with the above configuration, it is possible to suppress the influence of the voltage of the storage battery, thereby making it possible to properly determine abnormalities in the discharge restriction unit.

Further, the switching control unit may be configured to control the opening and closing of the intra-system switch. The abnormality determination unit may be configured to determine, based on whether there is a change in a voltage at the branch point when the intra-system switch is switched by the switching control unit from the open state to a closed state, whether an abnormality has occurred in the intra-system switch.

When the voltage at the branch point and the voltage of the storage battery, which are applied respectively to opposite ends of the intra-system switch, are different from each other, upon the intra-system switch being switched from the open state to the closed state, the voltage at the branch point changes due to the influence of the voltage of the storage battery. On the other hand, when a stuck-closed abnormality or a stuck-open abnormality has occurred in the intra-system switch, the voltage at the branch point does not change. Therefore, with the above configuration, it is possible to determine occurrence of the stuck-closed abnormality or the stuck-open abnormality in the intra-system switch.

The power supply system according to the present disclosure may be installed in a vehicle. Each of the electrical loads may perform a driver assistance function of the vehicle as well as at least one function necessary for driving of the vehicle. The driving mode of the vehicle may be switchable between a first mode using the driver assistance function and a second mode not using the driver assistance function. The power supply system may further include a mode control unit that permits the driving mode of the vehicle to be switched from the second mode to the first mode on condition that it is determined by the abnormality determination unit that no abnormality has occurred in the discharge restriction unit.

With the above configuration, prior to switching the driving mode of the vehicle from the second mode to the first mode, it is determined whether an abnormality has occurred in the discharge restriction unit. Consequently, even if the ambient environment of the power supply system becomes a low-temperature environment after the driving mode of the vehicle is switched from the second mode to the first mode, it will still be possible to properly drive the electrical loads with electric power supplied from the storage battery. As a result, it becomes possible to improve the reliability of driving the vehicle in the first mode.

First Embodiment

Hereinafter, an embodiment will be described with reference to the drawings; in the embodiment, a power supply system according to the present disclosure is embodied as an in-vehicle power supply system 100.

As shown in FIG. 1, the power supply system 100 is configured to supply electric power to general loads 30 and specific loads 32. Specifically, the power supply system 100 includes a high-voltage storage battery 10, a first DC-to-DC converter (hereinafter, to be simply referred to as the first converter) 12, a first storage battery 14, a second storage battery 16, a switch unit 20, a second DC-to-DC converter (hereinafter, to be simply referred to as the second converter) 26, and a control device 40 that serves as a "switching control unit".

The high-voltage storage battery 10 has a rated voltage (e.g., several hundred volts) higher than those of the first storage battery 14 and the second storage battery 16. The high-voltage storage battery 10 may be implemented by, for example, a lithium-ion battery. The first converter 12 serves as a voltage generator to convert the electric power supplied from the high-voltage storage battery 10 into electric power of a power supply voltage VA and supply the resultant electric power to the general loads 30 and the specific loads 32. In the present embodiment, the power supply voltage VA is set to a voltage by which it is possible to drive the general loads 30 and the specific loads 32.

The general loads 30 are electrical loads which are not used for driving control of a vehicle that is a moving object. The general loads 30 may include, for example, an air conditioner, an audio device and a power window.

On the other hand, the specific loads 32 are electrical loads each of which performs at least one function necessary for the driving control of the vehicle. The specific loads 32 may include, for example, an electric power steering device 50 for controlling steering of the vehicle, an electric brake device 51 for applying a braking force to wheels of the vehicle, and a travel control device 52 for monitoring the surrounding situation of the vehicle. In addition, in the present embodiment, the specific loads 32 correspond to "electrical loads" in the claims. When abnormalities occur in the specific loads 32 and all the functions of the specific loads 32 are lost due to the abnormalities, it will become impossible to perform the driving control of the vehicle. Therefore, to prevent the functions of the specific loads 32 from being completely lost when abnormalities occur in the specific loads 32, in the present embodiment, each of the specific loads 32 includes both a first load 34 and a second load 36 provided redundantly for performing the function(s) of the specific load 32. Specifically, the electric power steering device 50 includes both a first steering motor 50A and a second steering motor 50B. The electric brake device 51 includes both a first brake device 51A and a second brake device 51B. The travel control device 52 includes both a camera 52A and a laser radar 52B. In addition, each of the first steering motor 50A, the first brake device 51A and the camera 52A corresponds to a first load 34 while each of the second steering motor 50B, the second brake device 51B and the laser radar 52B corresponds to a second load 36.

For each of the specific loads 32, the first load 34 and the second load 36 constituting the specific load 32 together realize one function of the specific load 32; moreover, each of the first load 34 and the second load 36 can individually realize part of the function. For example, the vehicle can be freely steered by both the first steering motor 50A and the second steering motor 50B of the electric power steering device 50. Moreover, the vehicle can also be steered by only either one of the steering motors 50A and 50B under certain limitations on the steering speed, the steering range and the like.

During manual driving of the vehicle, each of the specific loads 32 realizes a function of assisting a driver in controlling the vehicle. Moreover, during autonomous driving of the vehicle, each of the specific loads 32 realizes a function necessary for the autonomous driving; in the autonomous driving, the vehicle behavior, such as traveling or stopping of the vehicle, is automatically controlled. Therefore, each of the specific loads 32 can also be referred to as a load that performs at least one function necessary for driving the vehicle.

The first loads 34 of the specific loads 32 are connected with the first converter 12 via a first conduction path LA1. Moreover, the first storage battery 14 and the general loads 30 are also connected with the first conduction path LA1. The first storage battery 14 may be implemented by, for example, a lead-acid battery. The first storage battery 14 is configured so that it can be charged by the power supply voltage VA of the first converter 12. In the present embodiment, a first system ES1 is constituted of the first converter 12, the first storage battery 14, the general loads 30 and the first loads 34 of the specific loads 32, all of which are connected with each other by the first conduction path LA1. In addition, in the present embodiment, the high-voltage storage battery 10 and the first converter 12 together correspond to a "first power supply" in the claims.

On the other hand, the second loads 36 of the specific loads 32 are connected with the second storage battery 16 via a second conduction path LA2. The second storage battery 16 may be implemented by, for example, a lithium-ion battery. In the present embodiment, a second system ES2 is constituted of the second storage battery 16 and the second loads 36 of the specific loads 32, all of which are connected with each other by the second conduction path LA2. In addition, in the present embodiment, the second storage battery 16 corresponds to both a "second power supply" and a "storage battery" in the claims.

The switch unit 20 is provided in a connection path LB that connects the first and second systems ES1 and ES2 with each other. The connection path LB has a first end connected with the first conduction path LA1 at a connection point PA, and a second end connected with the second conduction path LA2 at a connection point PB. The switch unit 20 includes a first switching element (hereinafter, to be simply referred to as the first switch) SW1. In the present embodiment, an N-channel MOSFET (hereinafter, to be simply referred to as the MOSFET) is employed as the first switch SW1. In addition, in the present embodiment, the first switch SW1 corresponds to an "inter-system switch" in the claims.

A first current detection unit 27 is provided in the first connection path LA1, whereas a second current detection unit 28 is provided in the connection path LB. Specifically, the first current detection unit 27 is provided in a part of the first connection path LA1, which is located between the connection point PA and the first loads 34 of the specific loads 32, to detect the magnitude and direction of intra-first-system current IA flowing through the part of the first connection path LA1. On the other hand, the second current detection unit 28 is provided in a part of the connection path LB, which is located closer than the switch unit 20 to the first system ES1, to detect the magnitude and direction of inter-system current IB flowing through the part of the connection path LB.

The second converter 26 is provided in the second conduction path LA2. Specifically, in the second conduction path LA2, the second converter 26 is provided between the connection point PB, at which the connection path LB is connected with the second conduction path LA2, and the second storage battery 16. The second converter 26 converts the electric power of the power supply voltage VA supplied from the first converter 12 into electric power of a voltage higher than the power supply voltage VA, and charges the second storage battery 16 with the resultant electric power. That is, the second converter 26 performs a boosting operation for boosting the power supply voltage VA; and the second storage battery 16 is a storage battery which can be charged by the power supply voltage VA. In addition, in the present embodiment, the second converter 26 corresponds to a "charging unit" in the claims.

In order to operate switching of the first switch SW1, the control device 40 generates a first switching signal SC1 based on the detected values of the first and second current detection units 27 and 28 and outputs a command by the first switching signal SC1 to the first switch SW1. Consequently, by the first switching signal SC1, the first switch SW1 is switched between a state in which it is open and a state in which it is closed. Moreover, in order to control operations of the first and second converters 12 and 26, the control device 40 generates first and second control signals SD1 and SD2 and outputs commands by the first and second control signals SD1 and SD2 to the first and second converters 12 and 26. Consequently, by the first and second control signals SD1 and SD2, the first and second converters 12 and 26 are switched between an operating state and a stopped state and the voltage difference caused by the boosting operation of the second converter 26 between the voltage of the second storage battery 16 and the power supply voltage VA, i.e., the boosting amount BA of the second converter 26 is controlled. In addition, in the present embodiment, the state in which first switch SW1 is open corresponds to a "first state" in the claims; and the state in which first switch SW1 is closed corresponds to a "second state" in the claims.

Furthermore, the control device 40 is connected with a notification unit 44, an IG switch 45 and an input unit 46 to control them. The notification unit 44 is a device which visually or audibly notifies the driver of the vehicle. The notification unit 44 may be implemented by, for example, a display or a speaker installed in the vehicle compartment. The IG switch 45 is a start switch of the vehicle. The control device 40 monitors the opening/closing of the IG switch 45. The input unit 46 is a device which receives the driver's operation. The input unit 46 may include, for example, a steering wheel, a lever, a button, a pedal and a voice input device.

The control device 40 controls manual driving and autonomous driving of the vehicle using the specific loads 32 described above. The control device 40 is configured with a well-known microcomputer which includes a CPU, a ROM, a RAM, a flash memory and the like. The CPU realizes, using calculation programs and control data stored in the ROM, various functions for manual driving and autonomous driving of the vehicle.

In addition, manual driving denotes a state in which driving of the vehicle is controlled by the driver's operation. In contrast, autonomous driving denotes a state in which driving of the vehicle is controlled according to the control content of the control device 40 regardless of the driver's operation. Specifically, in the present embodiment, autonomous driving denotes autonomous driving of level 3 or higher among autonomous driving levels from level 0 to level 5 defined by the National Highway Traffic Safety Administration (NHTSA). In addition, level 3 is a level at which the control device 40 controls both the steering wheel operation and the acceleration/deceleration of the vehicle while observing the traveling environment of the vehicle.

The control device 40 can perform, using the specific loads 32 described above, driver assistance functions such as a Lane Keeping Assist (LKA), a Lane Change Assist (LCA) and a Pre-Crash Safety (PCS). The control device 40 can switch the driving mode of the vehicle between a first mode using the driver assistance functions and a second mode not using the driver assistance functions; and the vehicle can travel in each of the first and second modes. Specifically, the control device 40 switches the driving mode of the vehicle between the first mode and the second mode in accordance with a switching command of the driver inputted via the input unit 46. In the present embodiment, the first mode includes both a mode in which the driver manually drives the vehicle using the driver assistance functions and a mode in which the vehicle is automatically driven. In contrast, the second mode is a mode in which the driver manually drives the vehicle without using the driver assistance functions.

In the first mode, the control device 40 determines whether abnormalities have occurred in the first system ES1 and the second system ES2. When it is determined that no abnormality has occurred in both the first and second systems ES1 and ES2, autonomous driving of the vehicle and driver assistance are performed using the first loads 34 and the second loads 36. Consequently, the first and second loads 34 and 36 of each of the specific loads 32 together perform at least one function necessary for the autonomous driving and driver assistance. In the present embodiment, abnormalities denote power failure abnormalities such as a ground fault and an open circuit.

On the other hand, when it is determined that an abnormality has occurred in either of the first and second systems ES1 and ES2, the first switch SW1 is opened to electrically isolate the first and second systems ES1 and ES2 from each other. Consequently, it becomes possible to drive, when an abnormality has occurred in one of the first and second systems ES1 and ES2, the loads 34 or 36 of the other of the first and second systems ES1 and ES2 which has no abnormality occurring therein.

Moreover, when the voltage required for driving the first and second loads 34 and 36 of the specific loads 32 becomes high under a low-temperature or/and high-load condition, if the second storage battery 16 has been charged to a voltage higher than the power supply voltage VA with electric power supplied from the first converter 12, it will be possible to properly drive the first and second loads 34 and 36 with electric power stored in the second storage battery 16. In this case, it is desirable to restrict unnecessary discharge from the second storage battery 16 while charging the second storage battery 16 at a voltage higher than the power supply voltage VA.

In view of the above, in the second system ES2, a first path LC1 and a second path LC2 are provided in parallel with each other between the connection point PB, at which the connection path LB is connected with the second conduction path LA2, and the second storage battery 16. In the first path LC1, there is provided the aforementioned second converter 26; through the electric power conversion by the second converter 26 with the first switch SW1 closed, the second storage battery 16 is charged at a voltage higher than the power supply voltage VA with electric power supplied from the first converter 12. In the present embodiment, the second converter 26 is configured as a one-way electric power converter which includes only a booster circuit for boosting the power supply voltage VA to a higher voltage and charging the second storage battery 16 with the higher voltage.

On the other hand, in the second path LC2, there is provided a discharge restriction unit 24 that is configured to restrict discharge of the second storage battery 16 in the second system ES2. More particularly, the present embodiment, the discharge restriction unit 24 is configured with second and third switching elements (hereinafter, to be simply referred to as the second and third switches) SW2 and SW3 for selectively opening and closing the second path LC2. Moreover, in the present embodiment, each of the second and third switches SW2 and SW3 is implemented by a MOSFET. In order to operate switching of the second and third switches SW2 and SW3, the control device 40 generates second and third switching signals SC2 and SC3 and outputs commands by the second and third switching signals SC2 and SC3 respectively to the second and third switches SW2 and SW3. In addition, in the present embodiment, each of the second and third switches SW2 and SW3 corresponds to a "battery switch" in the claims.

A second diode DA2, which is a parasitic diode, is connected in parallel with the second switch SW2. Similarly, a third diode DA3, which is also a parasitic diode, is connected in parallel with the third switch SW3. Further, in the present embodiment, the second and third switches SW2 and SW3 are connected in series with each other such that the orientations of the second and third diodes DA2 and DA3 are the same. Specifically, each of the second and third diodes DA2 and DA3 is arranged with its cathode on the connection path LB side and its anode on the second storage battery 16 side. In addition, the forward voltage drop amount of each of the second and third diodes DA2 and DA3 is VF.

Moreover, a fourth switching element (hereinafter, to be simply referred to as the fourth switch) SW4 is provided between the second storage battery 16 and a branch point PC between the first and second paths LC1 and LC2 on the second storage battery 16 side. In the present embodiment, the fourth switch SW4 is implemented by a MOSFET. In order to operate switching of the fourth switch SW4, the control device 40 generates a fourth switching signal SC4 and outputs a command by the fourth switching signal SC4 to the fourth switch SW4. In addition, in the present embodiment, the fourth switch SW4 corresponds to an "intrasystem switch" in the claims.

In the discharge restriction unit 24, upon the second and third switches SW2 and SW3 being brought into an open state by the second and third switching signals SC2 and SC3, unnecessary discharge from the second storage battery 16 is restricted. On the other hand, upon the second and third switches SW2 and SW3 being brought into a closed state by the second and third switching signals SC2 and SC3, discharge from the second storage battery 16 to the first and second loads 34 and 36 of the specific loads 32 is allowed.

However, upon occurrence of a stuck-closed abnormality (i.e., an abnormality in which the switch is stuck closed and thus cannot be opened) in, for example, the second switch SW2, during charging of the second storage battery 16 by the second converter 26, despite the fact that the voltage of the second storage battery 16 cannot be sufficiently increased due to discharge from the second storage battery 16 via the second switch SW2 and the third diode DA3, supply of electric power to the second storage battery 16 is continued, resulting in an increase in the electric power consumption of the power supply system 100. Consequently, it may become impossible to properly perform charging of the second storage battery 16.

Otherwise, upon occurrence of a stuck-open abnormality (i.e., an abnormality in which the switch is stuck open and thus cannot be closed) in, for example, the third switch SW3, under a low-temperature or/and high-load condition, discharging of the second storage battery 16 is performed via the second switch SW2 and the third diode DA3. In this case, due to the forward voltage drop of the third diode DA3, the voltage applied to the first and second loads 34 and 36 of the specific loads 32 by supply of electric power from the second storage battery 16 is lowered, making it impossible to properly drive the first and second loads 34 and 36. Consequently, it may become impossible to properly perform discharging of the second storage battery 16.

In view of the above, in a control process according to the present embodiment, it is determined whether an abnormality has occurred in the discharge restriction unit 24; and when it is determined that an abnormality has occurred in the discharge restriction unit 24, the use of the second storage battery 16 is restricted. Specifically, charging of the second storage battery 16 by the second converter 26 is restricted, thereby restricting charging/discharging of the second storage battery 16. Consequently, when an abnormality has occurred in the discharge restriction unit 24, supply of electric power to the second storage battery 16 is suppressed; thus, it becomes possible to properly perform charging/discharging of the second storage battery 16.

Figure 2:
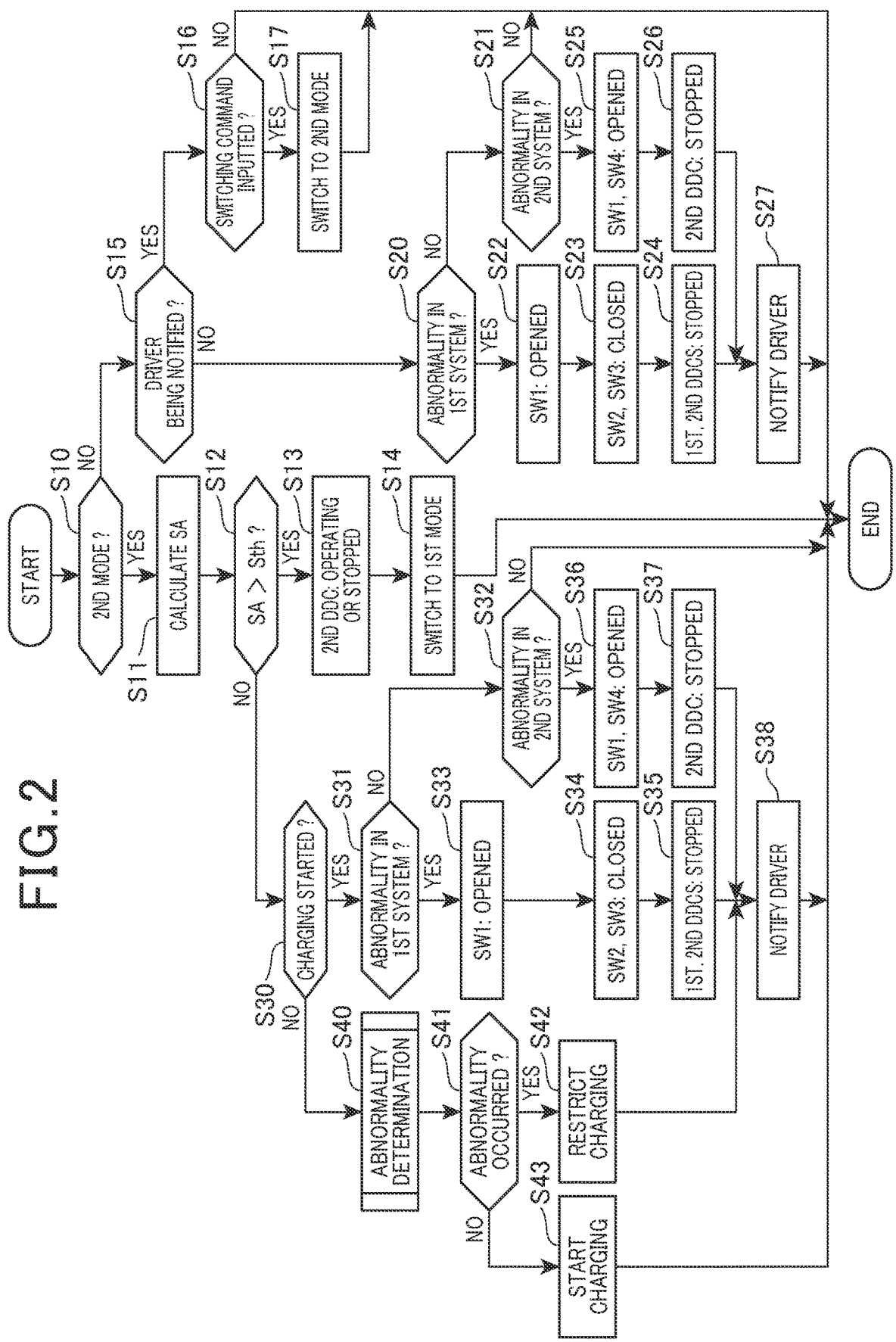
FIG. 2 is a flowchart illustrating steps of a control process according to the first embodiment.

FIG. 2 is a flowchart illustrating the control process according to the present embodiment. Upon the IG switch 45 being closed, the control device 40 repeatedly performs the control process at predetermined control cycles. It should be noted that at the initial time when the IG switch 45 is closed, the driving mode of the vehicle is set to the second mode. Moreover, at the initial time, the first switch SW1 is in a closed state; and the first converter 12 is in the operating state.

Upon the control process being started, first, in step S10, it is determined whether the driving mode of the vehicle is the second mode. If the result of the determination in step S10 is affirmative, the control process proceeds to step S11. In step S11, the residual capacity SA of the second storage battery 16 is calculated; then the control process proceeds to step S12. The residual capacity SA may be represented by, for example, the SOC (i.e., State Of Charge) of the second storage battery 16. When the second storage battery 16 is in an energized state (i.e., charged state or discharged state), the residual capacity SA is calculated using the current integrated value that is the time-integrated value of the charging/discharging current of the second storage battery 16.

In step S12, it is determined whether the residual capacity SA calculated in step S11 is higher than a predetermined capacity threshold Sth. Here, the capacity threshold Sth is a capacity at which the battery voltage VB (i.e., the voltage of the second storage battery 16) becomes higher than the power supply voltage VA by a predetermined value or more. When the residual capacity SA of the second storage battery 16 is lower than the capacity threshold Sth, the battery voltage VB is not higher than the power supply voltage VA by the predetermined value or more and thus the prerequisite for driving the vehicle in the first mode is not satisfied. Accordingly, if the result of the determination in step S12 is negative, the control process proceeds to step S30.

In contrast, when the residual capacity SA of the second storage battery 16 is higher than the capacity threshold Sth, the battery voltage VB is higher than the power supply voltage VA by the predetermined value or more and thus the prerequisite for driving the vehicle in the first mode is satisfied. Accordingly, if the result of the determination in step S12 is affirmative, the control process proceeds to step S13. In step S13, the second converter 26 is controlled so as to be suitably switched between the operating state (i.e., charged state) and the stopped state according to the residual capacity SA of the second storage battery 16. In subsequent step S14, the driving mode of the vehicle is permitted to be switched from the second mode to the first mode. Then, the control process is terminated. In addition, the switching of the driving mode to the first mode is performed when a switching command, such as a command to use the driver assistance functions or a command to automatically drive the vehicle, is inputted from the driver via the input unit 46. In the present embodiment, step S14 corresponds to a "mode control unit" in the claims.

On the other hand, if the result of the determination in step S10 is negative, the control process proceeds to step S15. In step S15, it is determined whether a driver notification is being made. Here, the driver notification is a notification of notifying the driver that an abnormality has occurred in either of the first and second systems ES1 and ES2, notifying the driver that the first mode is to be terminated and prompting the driver to switch the driving mode to the second mode.

If the result of the determination in step S15 is negative, the control process proceeds to steps S20 and S21 in which it is determined whether an abnormality has occurred in either of the first and second systems ES1 and ES2. Specifically, in step S20, it is determined whether an abnormality has occurred in the first system ES1. If the result of the determination in step S20 is negative, the control process proceeds to step S21. In step S21, it is determined whether an abnormality has occurred in the second system ES2.

Occurrence of an abnormality in either of the first and second systems ES1 and ES2 can be determined based on the magnitudes of the currents IA and IB detected by the first and second current detection units 27 and 28. For example, when a ground fault has occurred in the first system ES1, the magnitude of the intra-first-system current IA detected by the first current detection unit 27 is higher than or equal to a current threshold Ith1 preset for ground fault determination. In contrast, when a ground fault has occurred in the second system ES2, the magnitude of the inter-system current IB detected by the second current detection unit 28 is higher than or equal to the current threshold Ith1 preset for ground fault determination. Therefore, it is possible to determine, based on the magnitudes of the currents IA and IB detected by the first and second current detection units 27 and 28, which one of the first and second systems ES1 and ES2 has an abnormality occurring therein.

When no abnormality has occurred in either of the first and second systems ES1 and ES2, the result of the determination in step S21 is negative. Then, the control process is terminated. Consequently, the first switch SW1 is kept in the closed state and electric power can be supplied from the first converter 12 and the second storage battery 16 to the first and second systems ES1 and ES2.

In contrast, when an abnormality has occurred in one of the first and second systems ES1 and ES2, the supply of electric power to the electrical loads of the one of the two systems which has the abnormality occurring therein is stopped while the supply of electric power to the electrical loads of the other of the two systems which has no abnormality occurring therein is continued.

Specifically, if the result of the determination in step S20 is affirmative, the control process proceeds to step S22. In step S22, the first switch SW1 is opened. Then, in step S23, both the second and third switches SW2 and SW3 are closed to release the restriction on discharge through the second path LC2. That is, when it is determined that an abnormality has occurred in the first system ES1, the first switch SW1 is opened and then both the second and third switches SW2 and SW3 are closed. As a result, supply of electric power from the second storage battery 16 to the second loads 36 of the specific loads 32 via the second path LC2 is secured. In subsequent step S24, commands are outputted to switch both the first and second converters 12 and 26 from the operating state to the stopped state. Then, the control process proceeds to step S27.

If the result of the determination in step S21 is affirmative, the control process proceeds to step S25. In step S25, both the first and fourth switches SW1 and SW4 are opened. Consequently, the supply of electric power from the first converter 12 to the first loads 34 of the specific loads 32 in the first system ES1 is continued. In subsequent step S26, a command is outputted to switch the second converter 26 from the operating state to the stopped state. Then, the control process proceeds to step S27.

In step S27, the driver is notified, via the notification unit 44, that the first mode is to be terminated. Then, the control process is terminated.

If the result of the determination in step S15 is affirmative, the control process proceeds to step S16. In step S16, it is determined whether a switching command is inputted from the driver via the input unit 46 to switch the driving mode of the vehicle to the second mode. In other words, it is determined whether there is a response of the driver to the driver notification. If the result of the determination in step S16 is negative, the control process is terminated. Consequently, the driving of the vehicle in the first mode is continued using the loads 34 or 36 of the one of the two systems which has no abnormality occurring therein.

Otherwise, if the result of the determination in step S16 is affirmative, the control process proceeds to step S17. In step S17, the driving mode of the vehicle is switched from the first mode to the second mode. Then, the control process is terminated.

On the other hand, in step S30, it is determined whether charging of the second storage battery 16 has been started. Specifically, it is determined whether charging of the second storage battery 16 has been started in step S43 which will be described later. If the result of the determination in step S30 is affirmative, the control process proceeds to steps S31 and S32. In contrast, if the result of the determination in step S30 is negative, the control process proceeds to step S40.

In steps S31 and S32, it is determined whether an abnormality has occurred in either of the first and second systems ES1 and ES2. Specifically, in step S31, it is determined whether an abnormality has occurred in the first system ES1. If the result of the determination in step S31 is negative, the control process proceeds to step S32. In step S32, it is determined whether an abnormality has occurred in the second system ES2.

When no abnormality has occurred in either of the first and second systems ES1 and ES2, the result of the determination in step S32 is negative. Then, the control process is terminated. Consequently, the driving of the vehicle in the second mode and charging of the second storage battery 16 are continued.

In contrast, when an abnormality has occurred in one of the first and second systems ES1 and ES2, steps S33 to S37 are performed to stop the supply of electric power to the electrical loads of the one of the two systems which has the abnormality occurring therein while continuing the supply of electric power to the electrical loads of the other of the two systems which has no abnormality occurring therein. It should be noted that steps S33 to S37 are respectively identical to steps S22 to S26 described above; therefore, explanation of steps S33 to S37 will be omitted hereinafter.

Figure 3:
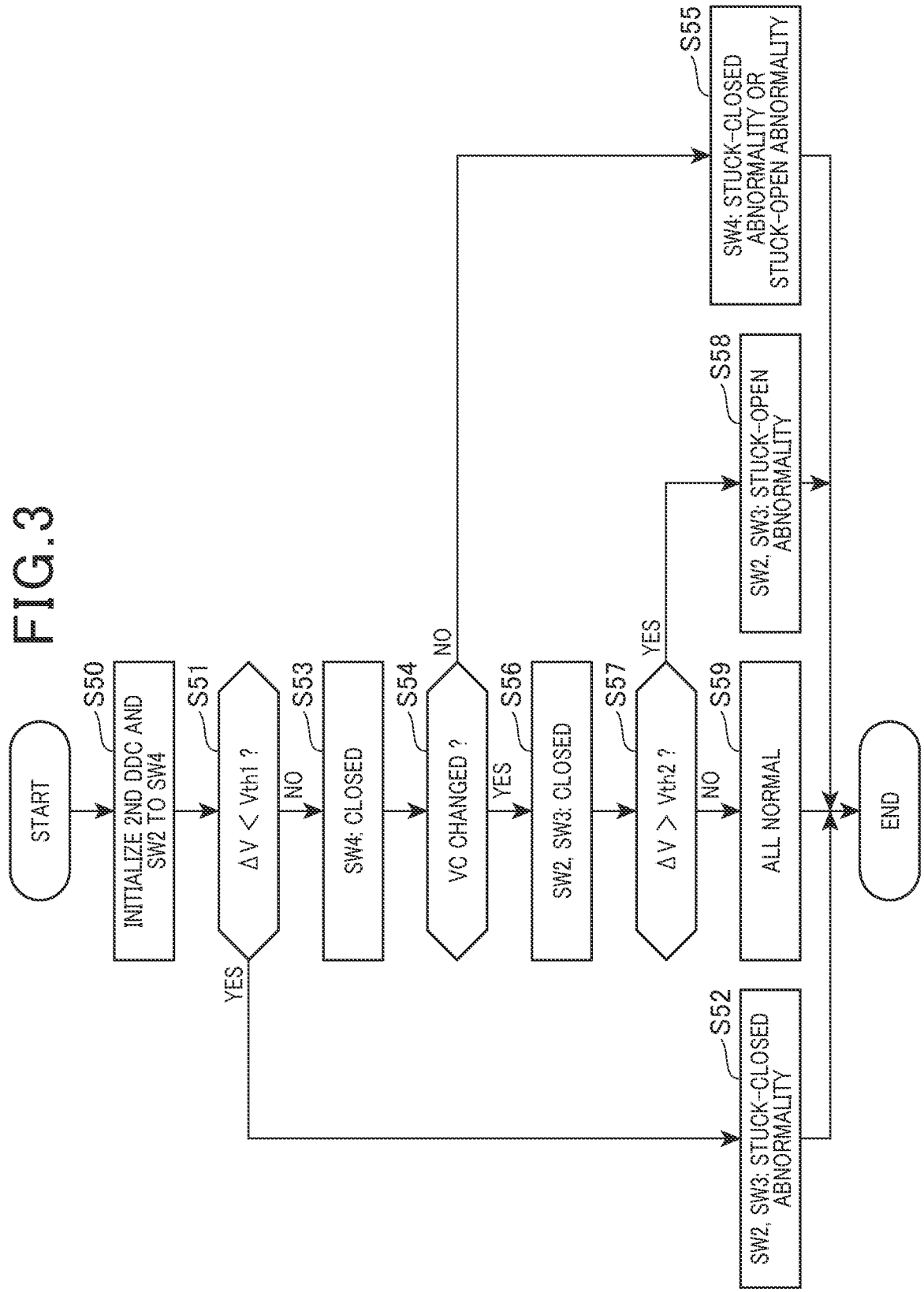
FIG. 3 is a flowchart illustrating steps of an abnormality determination process according to the first embodiment.

In step S40, an abnormality determination is performed to determine whether an abnormality has occurred in the discharge restriction unit 24 or the fourth switch SW4. The abnormality determination is performed when the second converter 26 is in the operating state, i.e., during the boosting operation of the second converter 26. Hereinafter, the abnormality determination process will be described in detail with reference to the flowchart shown in FIG. 3. In addition, in the present embodiment, step S40 corresponds to an "abnormality determination unit" in the claims.

In the abnormality determination process, first, in step S50, the second converter 26 and the second to fourth switches SW2 to SW4 are initialized. Specifically, a command is outputted to set the second converter 26 to the operating state; and the second to fourth switches SW2 to SW4 are set to the open state. In addition, the boosting amount BA of the second converter 26 is set to be equal to the voltage difference (2VF) due to the second and third diodes DA2 and DA3. Then, the abnormality determination process proceeds to step S51.

In step S51, the voltage difference $\Delta V$ between the branch-point voltage VC (i.e., the voltage at the branch point PC) and the power supply voltage VA applied to the connection point PB is acquired; and it is determined whether the voltage difference $\Delta V$ is smaller than a predetermined first threshold Vth1. The first threshold Vth1 is set to a value larger than the forward voltage drop amount VF and smaller than twice the forward voltage drop amount VF.

Figure 4:
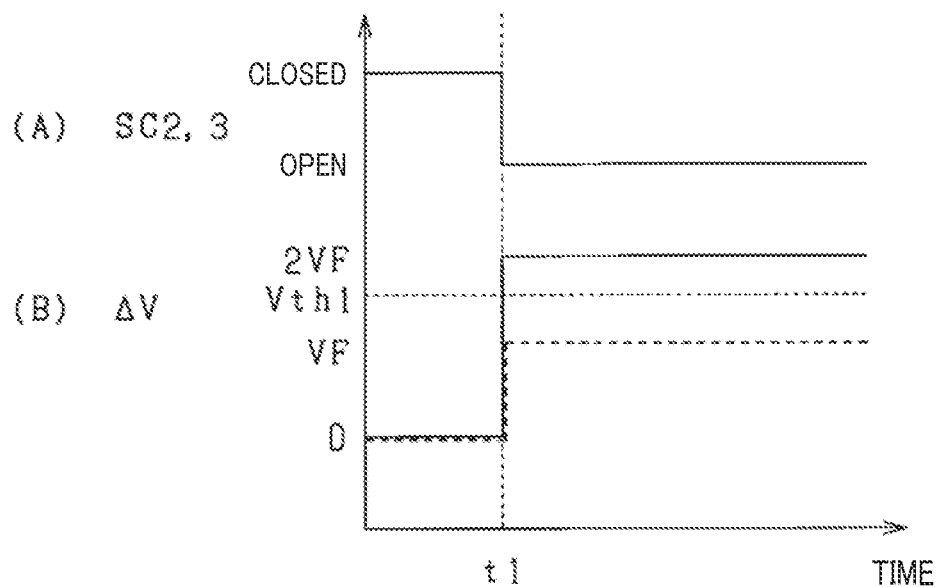
FIG. 4 is a timing chart illustrating an example of the abnormality determination process according to the first embodiment.

FIG. 4 shows the change in the voltage difference $\Delta V$ when the commands are outputted to open the second and third switches SW2 and SW3. As shown in FIG. 4, when both the second and third switches SW2 and SW3 are normal, upon the commands being outputted, at a time instant t1 during the boosting operation of the second converter 26, by the second and third switching signals SC2 and SC3 to open the second and third switches SW2 and SW3, the voltage difference $\Delta V$ becomes twice the forward voltage drop amount VF (see the solid line in FIG. 4(B)). In contrast, when the stuck-closed abnormality has occurred in one of the second and third switches SW2 and SW3, the voltage difference $\Delta V$ becomes equal to the forward voltage drop amount VF (see the dashed line in FIG. 4(B)) and thus smaller than the first threshold Vth1; hence, the result of the determination in step S51 is affirmative. In this case, in step S52, it is determined that the stuck-closed abnormality has occurred in one of the second and third switches SW2 and SW3. Then, the abnormality determination process is terminated.

Otherwise, if the result of the determination in step S51 is negative, the abnormality determination process proceeds to step S53. In step S53, the fourth switch SW4 is closed. Then, in subsequent step S54, it is determined whether there is a change in the branch-point voltage VC before and after the closing of the fourth switch SW4.

When the branch-point voltage VC generated from the power supply voltage VA of the first converter 12 and the battery voltage VB (i.e., the voltage of the second storage battery 16) are different from each other, upon the fourth switch SW4 being switched from the open state to the closed state, the branch-point voltage VC changes above a specified voltage due to the influence of the battery voltage VB. On the other hand, when the stuck-closed abnormality or the stuck-open abnormality has occurred in the fourth switch SW4, the branch-point voltage VC does not change above the specified voltage; hence, the result of the determination in step S54 is negative. In this case, in S55, it is determined that the stuck-closed abnormality or the stuck-open abnormality has occurred in the fourth switch SW4. Then, the abnormality determination process is terminated.

That is, in step S54, it is determined whether an abnormality has occurred in the fourth switch SW4 based on whether there is a change in the branch-point voltage VC when the fourth switch SW4 is switched from the open state to the closed state.

Otherwise, when the fourth switch SW4 is normal, the result of the determination in step S54 is affirmative. In this case, in step S56, both the second and third switches SW2 and SW3 are closed. Then, in subsequent step S57, the voltage difference ΔV is acquired again; and it is determined whether the voltage difference ΔV is larger than a predetermined second threshold Vth2. The second threshold Vth2 is set to a value larger than zero and smaller than the forward voltage drop amount VF.

Figure 5:
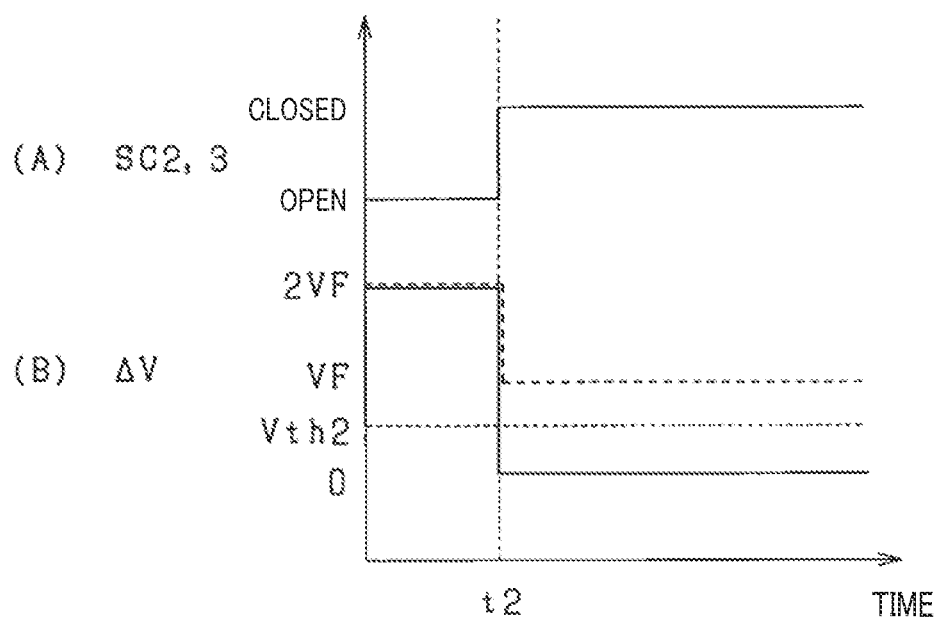
FIG. 5 is a timing chart illustrating another example of the abnormality determination process according to the first embodiment.

FIG. 5 shows the change in the voltage difference ΔV when the commands are outputted to close the second and third switches SW2 and SW3. As shown in FIG. 5, when both the second and third switches SW2 and SW3 are normal, upon the commands being outputted, at a time instant t2 during the boosting operation of the second converter 26, by the second and third switching signals SC2 and SC3 to close the second and third switches SW2 and SW3, the voltage difference ΔV becomes zero (see the solid line in FIG. 5(B)). In contrast, when the stuck-open abnormality has occurred in one of the second and third switches SW2 and SW3, the voltage difference ΔV becomes equal to the forward voltage drop amount VF (see the dashed line in FIG. 5(B)) and thus larger than the second threshold Vth2; hence, the result of the determination in step S57 is affirmative. In this case, in step S58, it is determined that the stuck-open abnormality has occurred in one of the second and third switches SW2 and SW3. Then, the abnormality determination process is terminated.

That is, in steps S51 and S57, the voltage difference ΔV between the branch-point voltage VC and the power supply voltage VA is acquired during the boosting operation of the second converter 26; and based on the voltage difference ΔV, it is determined whether an abnormality has occurred in the second and third switches SW2 and SW3, i.e., in the discharge restriction unit 24.

If the result of the determination in step S57 is negative, the abnormality determination process proceeds to step S59. In step S59, it is determined that all of the second to fourth switches SW2 to SW4 are normal. Then, the abnormality determination process is terminated.

Referring back to FIG. 2, in step S41, it is determined whether the result of the abnormality determination performed in step S40 indicates that at least one of the second to fourth switches SW2 to SW4 has an abnormality occurring therein. If the result of the determination in step S41 is affirmative, the control process proceeds to step S42. In step S42, charging of the second storage battery 16 by the second converter 26 is restricted. Specifically, the operation of the second converter 26 is stopped. Then, the control process proceeds to step S38. In step S38, the driver is notified, via the notification unit 44, that the first mode cannot be used.

Then, the control process is terminated. In addition, in the present embodiment, step S42 corresponds to a "use restriction unit" in the claims.

Otherwise, if the result of the determination in step S41 is negative, the control process proceeds to step S43. In step S43, charging of the second storage battery 16 is started. Specifically, charging of the second storage battery 16 is started by outputting a command to set the second converter 26 to the operating state, opening the second and third switches SW2 and SW3 and closing the fourth switch SW4. Then, the control process is terminated.

In addition, after charging of the second storage battery 16 is started in step S43, the residual capacity SA of the second storage battery 16 may be determined to be higher than the capacity threshold Sth in step S12 in a next cycle of the control process; and the driving mode of the vehicle may be switched from the second mode to the first mode in step S14 in the next cycle. Hence, in step S14, the driving mode of the vehicle is permitted to be switched from the second mode to the first mode on condition that no abnormality has been determined in step S40 to have occurred in the discharge restriction unit 24 or the fourth switch SW4.

According to the present embodiment described in detail above, it is possible to achieve the following advantageous effects.

In the present embodiment, the first path LC1 and the second path LC2 are provided in parallel with each other between the connection point PB, at which the connection path LB is connected with the second conduction path LA2, and the second storage battery 16. In the first path LC1, there is provided the second converter 26 by which the second storage battery 16 is charged at a voltage higher than the power supply voltage VA of the first converter 12 with electric power supplied from the first converter 12. On the other hand, in the second path LC2, there is provided the discharge restriction unit 24 by which discharge of the second storage battery 16 in the second system ES2 is restricted.

With the above configuration, the second storage battery 16 is charged to a voltage higher than the power supply voltage VA; thus, even in a low-temperature environment, it is possible to properly drive the first and second loads 34 and 36 of the specific loads 32 with electric power supplied from the second storage battery 16. Moreover, the discharge restriction unit 24 is provided in parallel with the second converter 26; therefore, although the second storage battery 16 is charged to a voltage higher than the power supply voltage VA, unnecessary discharge from the second storage battery 16 is restricted. Consequently, it becomes possible to properly supply electric power to the first and second loads 34 and 36 of the specific loads 32 in the power supply system 100 that includes a plurality of power supply systems.

Moreover, in the present embodiment, it is determined whether an abnormality has occurred in the discharge restriction unit 24; and when it is determined that an abnormality has occurred in the discharge restriction unit 24, the use of the second storage battery 16 is restricted. Specifically, charging of the second storage battery 16 by the second converter 26 is restricted, thereby restricting charging/discharging of the second storage battery 16. Consequently, when an abnormality has occurred in the discharge restriction unit 24, supply of electric power to the second storage battery 16 is suppressed. As a result, it becomes possible to suppress useless charging/discharging of the second storage battery 16, thereby suppressing electric power consumption of the power supply system 100; thus, it becomes possible to properly perform charging/discharging of the second storage battery 16.

To determine whether an abnormality has occurred in the discharge restriction unit 24, it is preferable to generate a predetermined voltage difference ΔV between the branch-point voltage VC and the power supply voltage VA in the second conduction path LA2. In the present embodiment, the voltage difference ΔV is generated by the boosting operation of the second converter 26; and it is determined, based on the voltage difference ΔV, whether an abnormality has occurred in the discharge restriction unit 24. Consequently, by properly controlling the second converter 26, it becomes possible to determine whether an abnormality has occurred in the discharge restriction unit 24 without employing any additional configuration for generating the voltage difference ΔV between the branch-point voltage VC and the power supply voltage VA in the second conduction path LA2. As a result, it becomes possible to simplify the configuration of the entire power supply system 100.

In the present embodiment, the discharge restriction unit 24 includes the second and third switches SW2 and SW3 for selectively opening and closing the second path LC2. Moreover, when the voltage difference ΔV is smaller than the predetermined first threshold Vth1 with both the second and third switches SW2 and SW3 being controlled so as to be opened or when the voltage difference ΔV is larger than the predetermined second threshold Vth2 with both the second and third switches SW2 and SW3 being controlled so as to be closed, it is determined that an abnormality has occurred in the discharge restriction unit 24. Consequently, it becomes possible to determine occurrence of the stuck-closed abnormality in which one of the second and third switches SW2 and SW3 is stuck closed and occurrence of the stuck-open abnormality in which one of the second and third switches SW2 and SW3 is stuck open.

In the present embodiment, the two different power supplies 12 and 16 are respectively connected to one end side and the other end side of the fourth switch SW4. When the branch-point voltage VC and the battery voltage VB, which are applied respectively to the two ends of the fourth switch SW4 by the two power supplies 12 and 16, are different from each other, upon the fourth switch SW4 being switched from the open state to the closed state, the branch-point voltage VC changes due to the influence of the battery voltage VB. On the other hand, when the stuck-closed abnormality or the stuck-open abnormality has occurred in the fourth switch SW4, the branch-point voltage VC does not change. In view of the above, in the present embodiment, it is determined whether an abnormality has occurred in the fourth switch SW4 based on whether there is a change in the branch-point voltage VC when the fourth switch SW4 is switched from the open state to the closed state. Consequently, it becomes possible to determine occurrence of the stuck-closed abnormality or the stuck-open abnormality in the fourth switch SW4.

In the present embodiment, the power supply system 100 is applied to a vehicle. The first and second loads 34 and 36 of the specific loads 32 are electrical loads which perform the driver assistance functions as well as functions necessary for the driving of the vehicle. Moreover, the driving mode of the vehicle is switchable between the first mode using the driver assistance functions and the second mode not using the driver assistance functions. Furthermore, in the present embodiment, the driving mode of the vehicle is permitted to be switched from the second mode to the first mode on condition that no abnormality has been determined to have occurred in the discharge restriction unit 24. That is, prior to switching the driving mode of the vehicle from the second mode to the first mode, it is determined whether an abnormality has occurred in the discharge restriction unit 24. Consequently, even if the ambient environment of the power supply system 100 becomes a low-temperature environment after the driving mode of the vehicle is switched from the second mode to the first mode, it will still be possible to properly drive the first and second loads 34 and 36 of the specific loads 32 with electric power supplied from the second storage battery 16. As a result, it becomes possible to improve the reliability of driving the vehicle in the first mode.

Second Embodiment

Hereinafter, the second embodiment will be described with reference to FIGS. 6 to 9, focusing on the differences thereof from the first embodiment.

Figure 6:
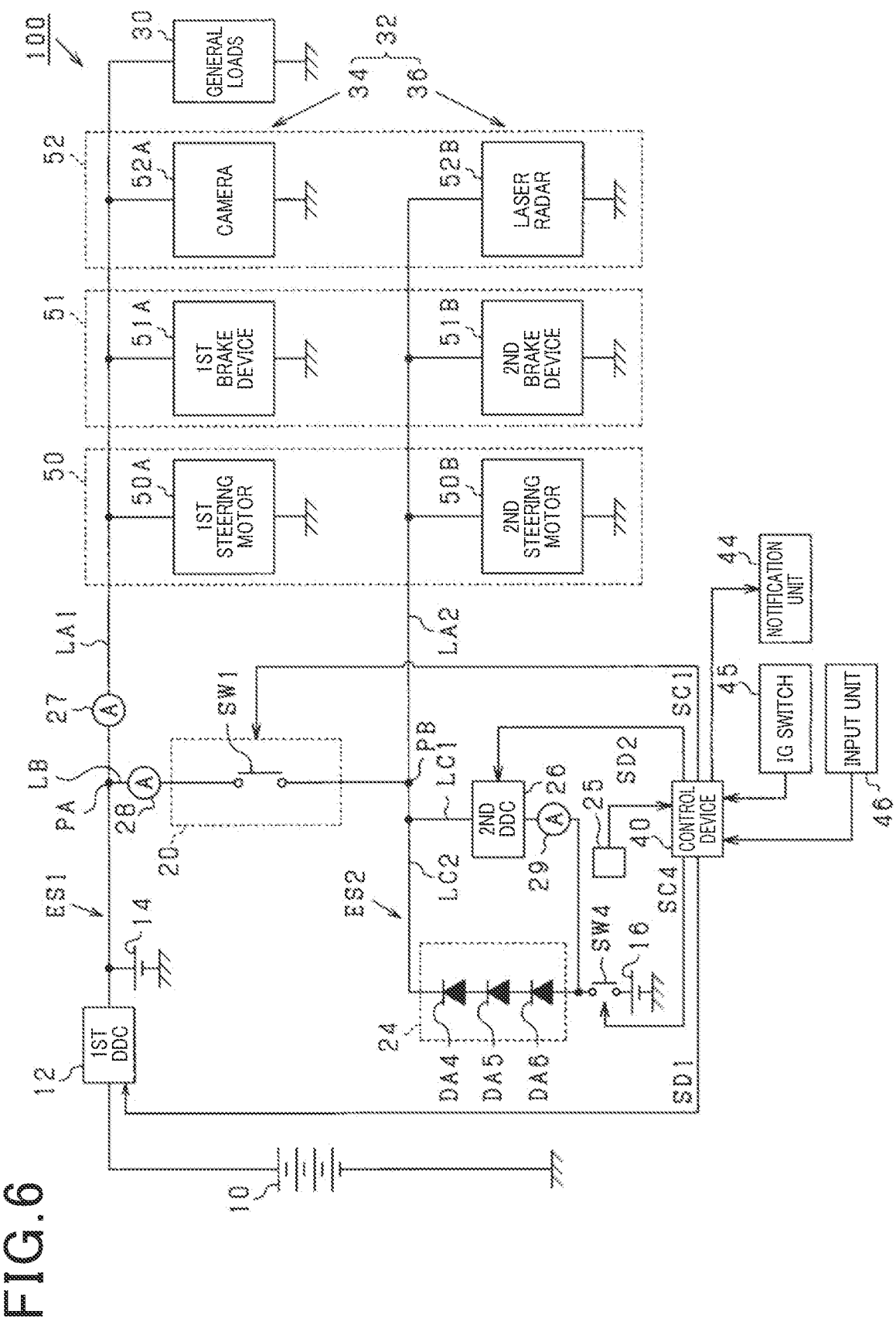
FIG. 6 is an overall configuration diagram of a power supply system according to a second embodiment.

In the present embodiment, as shown in FIG. 6, the discharge restriction unit 24 is configured with fourth to sixth diodes DA4 to DA6 that are connected in series with each other, instead of the second and third switches SW2 and SW3 and the second and third diodes DA2 and DA3 described in the first embodiment. Each of the fourth to sixth diodes DA4 to DA6 is arranged with its cathode on the connection point PB side and its anode on the second storage battery 16 side, so as to restrict flow of electric current from the connection point PB to the second storage battery 16 in the second path LC2. In addition, at the connection point PB, the connection path LB is connected with the second conduction path LA2.

Moreover, each of the fourth to sixth diodes DA4 to DA6 has a predetermined amount of forward voltage drop. Therefore, between the battery voltage VB and the power supply voltage VA, there is a voltage difference generated due to the sum of the forward voltage drop amounts of the fourth to sixth diodes DA4 to DA6 (hereinafter, to be simply referred to as the voltage difference due to the fourth to sixth diodes DA4 to DA6). The voltage difference is set to be a predetermined reference voltage difference VK when all of the fourth to sixth diodes DA4 to DA6 are normal. In addition, in the present embodiment, the serially-connected unit of the fourth to sixth diodes DA4 to DA6 corresponds to a "rectifying element" in the claims.

In the present embodiment, the power supply system 100 further includes a third current detection unit 29 and a temperature sensor 25. The third current detection unit 29 is provided on the second storage battery 16 side of the second converter 26 in the first path LC1, i.e., on the output side of the second converter 26. The third current detection unit 29 is configured to detect the magnitude and direction of intra-second-system current IC flowing through that part of the first path LC1 which is on the second storage battery 16 side of the second converter 26. The temperature sensor 25 is provided to detect a battery temperature TA which is the temperature of the second storage battery 16. The detected values of the third current detection unit 29 and the temperature sensor 25 are inputted to the control device 40.

Figure 7:
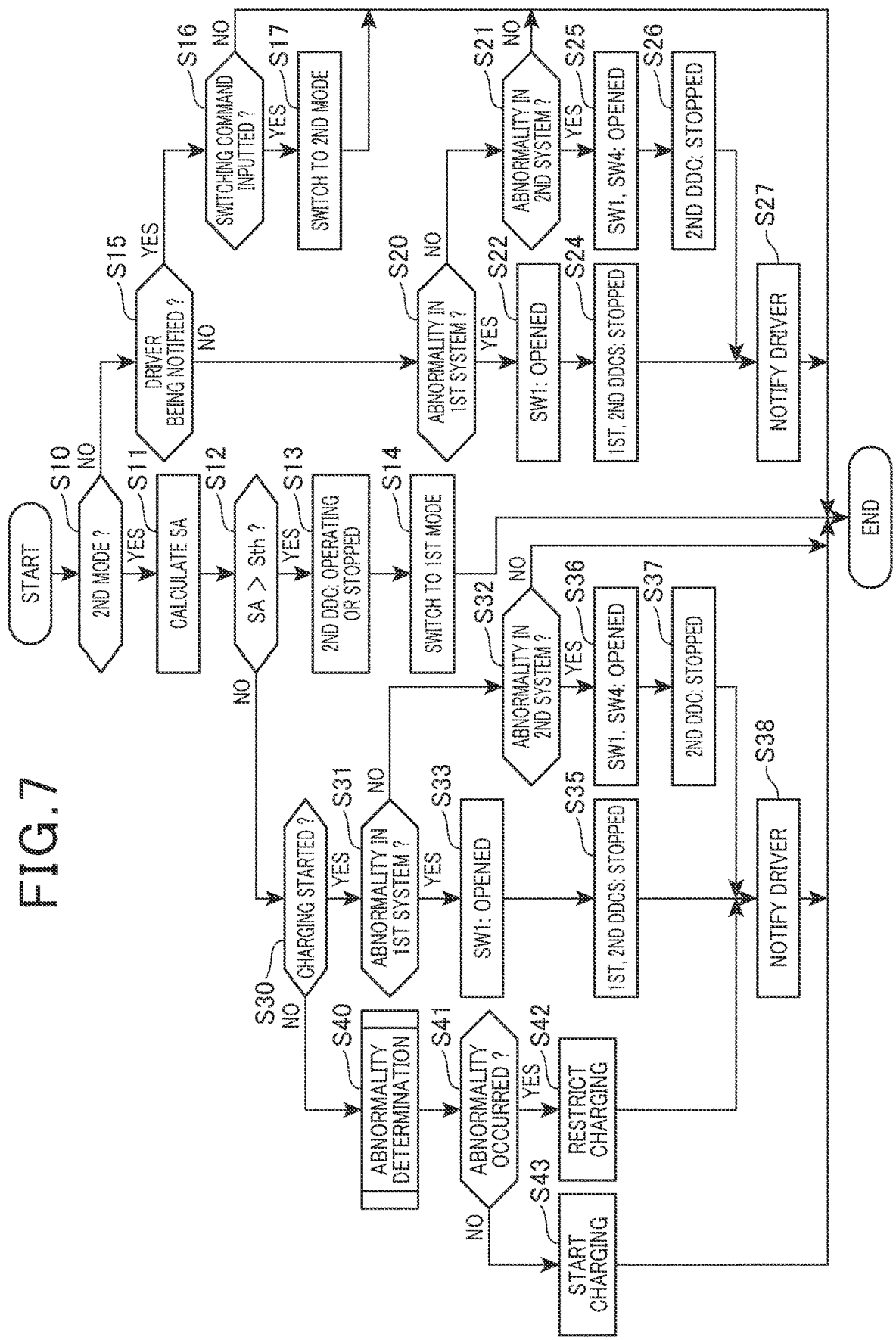
FIG. 7 is a flowchart illustrating steps of a control process according to the second embodiment.

FIG. 7 is a flowchart illustrating a control process according to the present embodiment. The control process according to the present embodiment is identical to the above-described control process according to the first embodiment (see FIG. 2), except that the control process according to the present embodiment does not include steps S23 and S34 included in the control process according to the first embodiment. Therefore, detailed explanation of the control process according to the present embodiment will be omitted hereinafter.

Figure 8:
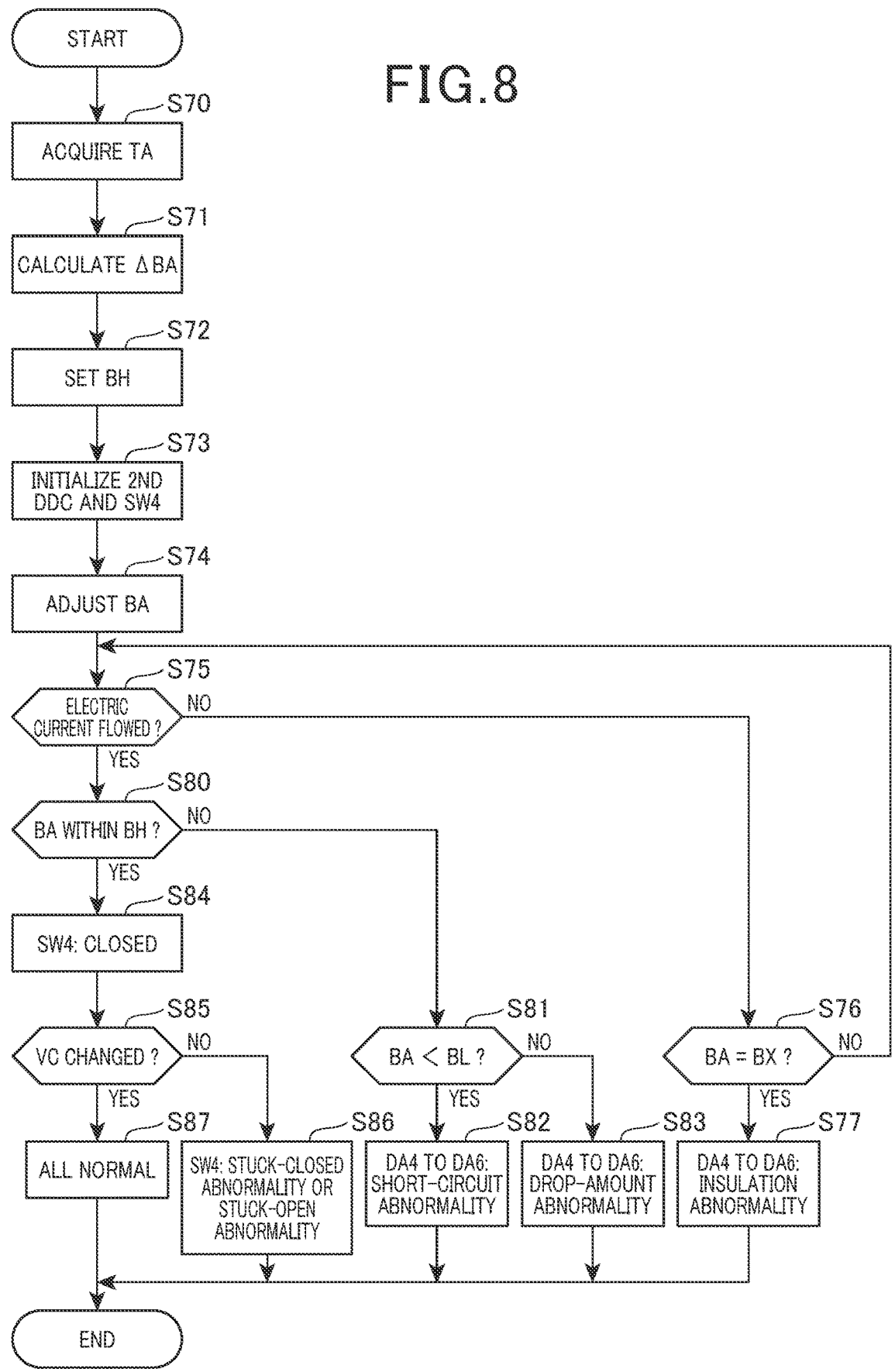
FIG. 8 is a flowchart illustrating steps of an abnormality determination process according to the second embodiment.

FIG. 8 is a flowchart illustrating an abnormality determination process according to the present embodiment. In this abnormality determination process, first, in step S70, the battery temperature TA is acquired using the temperature sensor 25. In subsequent step S71, variation information ΔBA indicating the degree of variation in the boosting amount BA is calculated based on the battery temperature TA acquired in step S70.

Specifically, in the present embodiment, the optimal value of the boosting amount BA changes from a predetermined reference value depending on the battery temperature TA; and variation in the boosting amount BA is caused by the temperature characteristic of the second storage battery 16. In the control device 40, there is stored information indicating the correlation between the temperature characteristic of the second storage battery 16 and the variation information ΔBA. In step S71, the variation information ΔBA is calculated using the information stored in the control device 40. Then, the abnormality determination process proceeds to step S72.

In step S72, a proper range BH (see FIG. 9) of the boosting amount BA is set according to the variation information ΔBA calculated in step S71. The proper range BH is a range whose width changes according to the variation information ΔBA, centering on a reference boosting amount BK that is the boosting amount BA corresponding to the reference voltage difference VK. In addition, in the present embodiment, the proper range BH corresponds to a "corresponding value" in the claims.

In step S73, the second converter 26 and the fourth switch SW4 are initialized. Specifically, a command is outputted to set the second converter 26 to the operating state; and the fourth switch SW4 is set to the open state.

In step S74, the boosting amount BA is adjusted. In the present embodiment, the boosting amount BA is adjusted up to a maximum boosting amount BX (see FIG. 9) that is larger than an upper limit of the proper range BH. Specifically, the boosting amount BA is adjusted so as to gradually increase from zero to the maximum boosting amount BX. In addition, in the present embodiment, step S74 corresponds to a "boosting control unit" in the claims.

In step S75, it is determined whether electric current has flowed through the third current detection unit 29, i.e., whether electric current has flowed through the annular path constituted of the first and second paths LC1 and LC2. Specifically, it is determined whether the magnitude of the intra-second-system current IC detected by the third current detection unit 29 is higher than a current threshold Ith2 preset for continuity determination. If the result of the determination in step S75 is negative, the abnormality determination process proceeds to step S76. In contrast, if the result of the determination in step S75 is affirmative, the abnormality determination process proceeds to step S80.

In step S76, it is determined whether the boosting amount BA has reached the maximum boosting amount BX. If the result of the determination in step S76 is negative, the abnormality determination process returns to step S75. In contrast, if the result of the determination in step S76 is affirmative, the abnormality determination process proceeds to step S77.

In step S77, it is determined that an insulation abnormality has occurred in the fourth to sixth diodes DA4 to DA6. The insulation abnormality is an abnormality in which no electric current flows through the second path LC2 even when the boosting amount BA has been increased to the maximum boosting amount BX. Then, the abnormality determination process is terminated.

In step S80, it is determined whether the boosting amount BA at which electric current started flowing through the third current detection unit 29 is within the proper range BH. If the result of the determination in step S80 is negative, the abnormality determination process proceeds to step S81. In contrast, if the result of the determination in step S80 is affirmative, the abnormality determination process proceeds to step S84.

In step S81, it is determined whether the boosting amount BA at which electric current started flowing through the third current detection unit 29 is smaller than a short-circuit boosting amount BL preset for short circuit determination.

If the result of the determination in step S81 is affirmative, the abnormality determination process proceeds to step S82. In step S82, it is determined that a short-circuit abnormality has occurred in the fourth to sixth diodes DA4 to DA6. The short-circuit abnormality is an abnormality in which electric current flows through the second path LC2 even when the boosting amount BA has not been increased to the short-circuit boosting amount BL. Then, the abnormality determination process is terminated.

In contrast, if the result of the determination in step S81 is negative, the abnormality determination process proceeds to step S83. In step S83, it is determined that a drop-amount abnormality has occurred in the fourth to sixth diodes DA4 to DA6. The drop-amount abnormality is an abnormality in which the voltage difference due to the fourth to sixth diodes DA4 to DA6 is different from the reference voltage difference VK. Then, the abnormality determination process is terminated.

In addition, the drop-amount abnormality includes both a lower-side abnormality in which the voltage difference due to the fourth to sixth diodes DA4 to DA6 is smaller than the reference voltage difference VK and a higher-side abnormality in which the voltage difference due to the fourth to sixth diodes DA4 to DA6 is larger than the reference voltage difference VK.

That is, in the abnormality determination process according to the present embodiment, when electric current flows through the fourth to sixth diodes DA4 to DA6 with the boosting amount BA being smaller than the lower limit of the proper range BH or when no electric current flows through the fourth to sixth diodes DA4 to DA6 with the boosting amount BA being larger than the upper limit of the proper range BH, it is determined that an abnormality has occurred in the discharge restriction unit 24 that includes the fourth to sixth diodes DA4 to DA6.

In step S84, the fourth switch SW4 is closed. That is, the above-described steps S73 to S83 are performed with the fourth switch SW4 opened; and the determination as to whether an abnormality has occurred in the discharge restriction unit 24 is made with the fourth switch SW4 opened.

In subsequent step S85, it is determined whether there is a change in the branch-point voltage VC before and after the closing of the fourth switch SW4.

If the result of the determination in step S85 is negative, the abnormality determination process proceeds to step S86. In step S86, it is determined that the stuck-closed abnormality or the stuck-open abnormality has occurred in the fourth switch SW4. Then, the abnormality determination process is terminated.

In contrast, if the result of the determination in step S85 is affirmative, the abnormality determination process proceeds to step S87. In step S87, it is determined that all of the fourth to sixth diodes DA4 to DA6 and the fourth switch SW4 are normal. Then, the abnormality determination process is terminated.

Referring back to FIG. 7, in step S41, it is determined whether the result of the abnormality determination performed in step S40 indicates that at least one of the fourth to sixth diodes DA4 to DA6 and the fourth switch SW4 has an abnormality occurring therein.

If the result of the determination in step S41 is affirmative, the control process proceeds to step S42. In step S42, charging of the second storage battery 16 by the second converter 26 is restricted. Then, the control process proceeds to step S38.

In contrast, if the result of the determination in step S41 is negative, the control process proceeds to step S43. In step S43, charging of the second storage battery 16 is started. Specifically, charging of the second storage battery 16 is started by outputting a command to set the second converter 26 to the operating state and closing the fourth switch SW4. Then, the control process is terminated.

Figure 9:
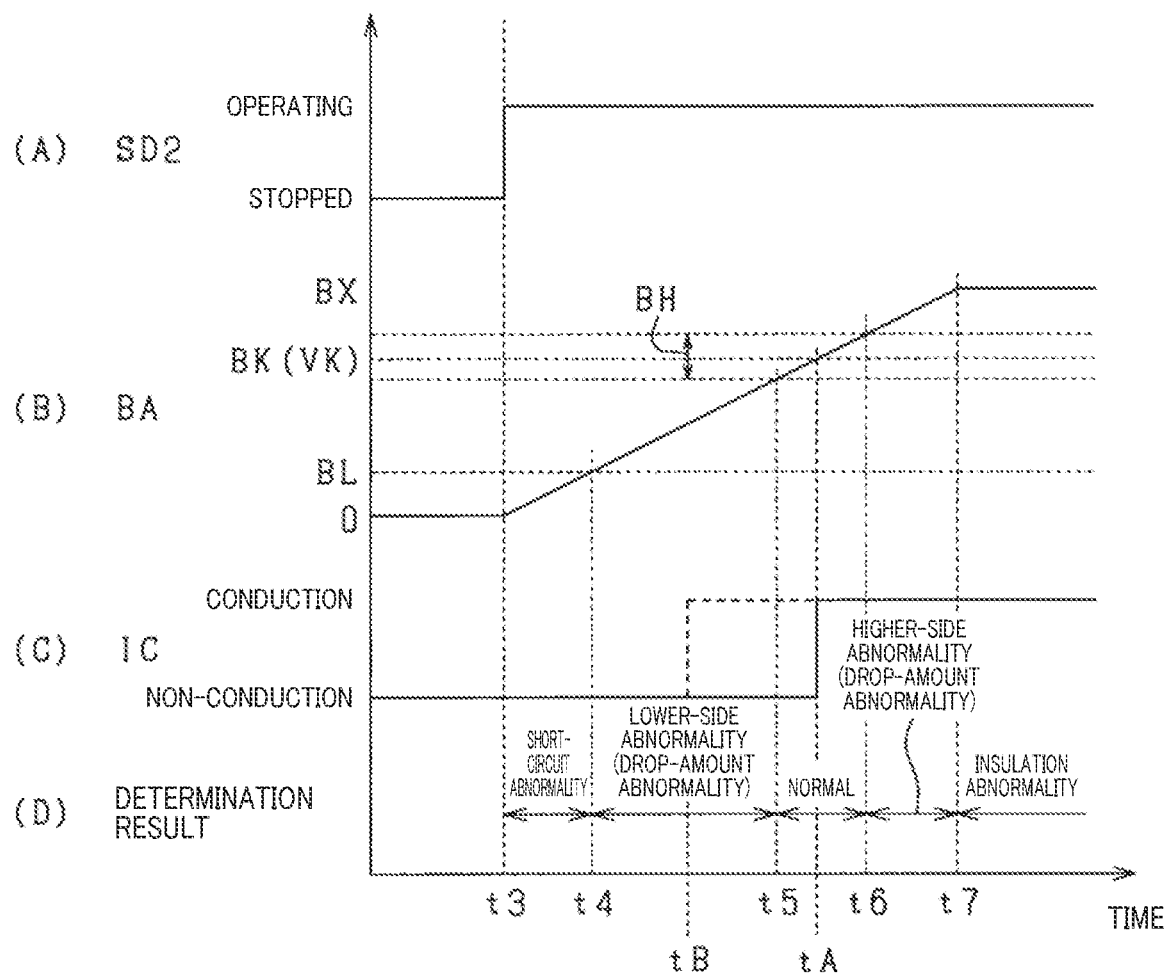
FIG. 9 is a timing chart illustrating an example of the abnormality determination process according to the second embodiment.

FIG. 9 illustrates an example of the abnormality determination process according to the present embodiment. Specifically, FIG. 9(A) shows the change with time of the command indicated by the second control signal SD2; FIG. 9(B) shows the change with time of the boosting amount BA; FIG. 9(C) shows the change with time of the intra-second-system current IC; and FIG. 9(D) shows the abnormality determination results of the fourth to sixth diodes DA4 to DA6.

As shown in FIG. 9, upon the command being outputted to set the second converter 26 to the operating state at a time instant t3, the boosting amount BA increases from zero to the maximum boosting amount BX in proportion to the elapsed time from the time instant t3. Consequently, the boosting amount BA reaches the short-circuit boosting amount BL at a time instant t4, reaches the lower limit of the proper range BH at a time instant t5, reaches the upper limit of the proper range BH at a time instant t6, and reaches the maximum boosting amount BX at a time instant t7.

As indicated by the solid line in FIG. 9(C), when the fourth to sixth diodes DA4 to DA6 are normal, the intra-second-system current IC is switched, during a time period from the time instant t5 to the time instant t6, from a non-conduction state in which no electric current flows through the third current detection unit 29 to a conduction state in which electric current flows through the third current detection unit 29. More particularly, in the example illustrated in FIG. 9(C), when the fourth to sixth diodes DA4 to DA6 are normal, the intra-second-system current IC is switched from the non-conduction state to the conduction state at a time instant tA corresponding to the reference boosting amount BK.

Otherwise, as indicated by the dashed line in FIG. 9(C), if the intra-second-system current IC is switched from the non-conduction state to the conduction state at a time instant tB between the time instant t4 and the time instant t5, the boosting amount BA at which electric current started flowing through the third current detection unit 29 is larger than the short-circuit boosting amount BL and smaller than the lower limit of the proper range BH. In this case, based on the boosting amount BA at which electric current started flowing through the third current detection unit 29, it is possible to determine that the lower-side abnormality has occurred in the discharge restriction unit 24. In addition, the other abnormalities can be similarly determined.

According to the present embodiment described in detail above, it is possible to achieve the following advantageous effects.

In the present embodiment, the discharge restriction unit 24 is configured with the fourth to sixth diodes DA4 to DA6 that are connected in series with each other; and by the fourth to sixth diodes DA4 to DA6, flow of electric current from the connection point PB to the second storage battery 16 in the second path LC2 is restricted and the predetermined reference voltage difference VK is generated between the battery voltage VB and the power supply voltage VA. Consequently, when the voltage required for driving the first and second loads 34 and 36 of the specific loads 32 becomes high under a low-temperature or/and high-load condition and the voltage applied to the first and second loads 34 and 36 is accordingly lowered, discharge from the second storage battery 16 to the first and second loads 34 and 36 is allowed. Moreover, when an abnormality has occurred in the first system ES1, discharge from the second storage battery 16 takes place with decrease in the voltage applied to the second loads 36 in the second system ES2, thereby making it possible to supply electric power to the second loads 36 in an early stage.

Moreover, in the present embodiment, the boosting amount BA of the second converter 26 is adjusted. When electric current flows through the fourth to sixth diodes DA4 to DA6 with the boosting amount BA being smaller than the lower limit of the proper range BH corresponding to the reference voltage difference VK or when no electric current flows through the fourth to sixth diodes DA4 to DA6 with the boosting amount BA being larger than the upper limit of the proper range BH, it is determined that an abnormality has occurred in the discharge restriction unit 24. Consequently, it becomes possible to determine whether an abnormality accompanied with fluctuations in the reference voltage difference VK has occurred in the fourth to sixth diodes DA4 to DA6.

When the optimal value of the boosting amount BA changes depending on the battery temperature TA, variation is caused in the boosting amount BA by the temperature characteristic of the second storage battery 16. In the present embodiment, the variation information ΔBA indicating the degree of variation in the boosting amount BA is acquired; and the proper range BH is varied according to the variation information ΔBA. Consequently, it becomes possible to properly determine, using the proper range BH corresponding to the variation information ΔBA for the boosting amount BA, whether an abnormality has occurred the discharge restriction unit 24.

In determining abnormalities in the discharge restriction unit 24, if the battery voltage VB is different from the branch-point voltage VC (i.e., the voltage resulting from the boosting operation of the second converter 26), abnormalities in the discharge restriction unit 24 cannot be properly determined due to the influence of the battery voltage VB. In this regard, in the present embodiment, abnormalities in the discharge restriction unit 24 are determined with the fourth switch SW4, which is provided between the branch point PC and the second storage battery 16, in the open state. Consequently, it becomes possible to suppress the influence of the battery voltage VB, thereby making it possible to properly determine abnormalities in the discharge restriction unit 24.

Third Embodiment

Hereinafter, the third embodiment will be described with reference to FIGS. 10 to 12, focusing on the differences thereof from the second embodiment.

Figure 10:
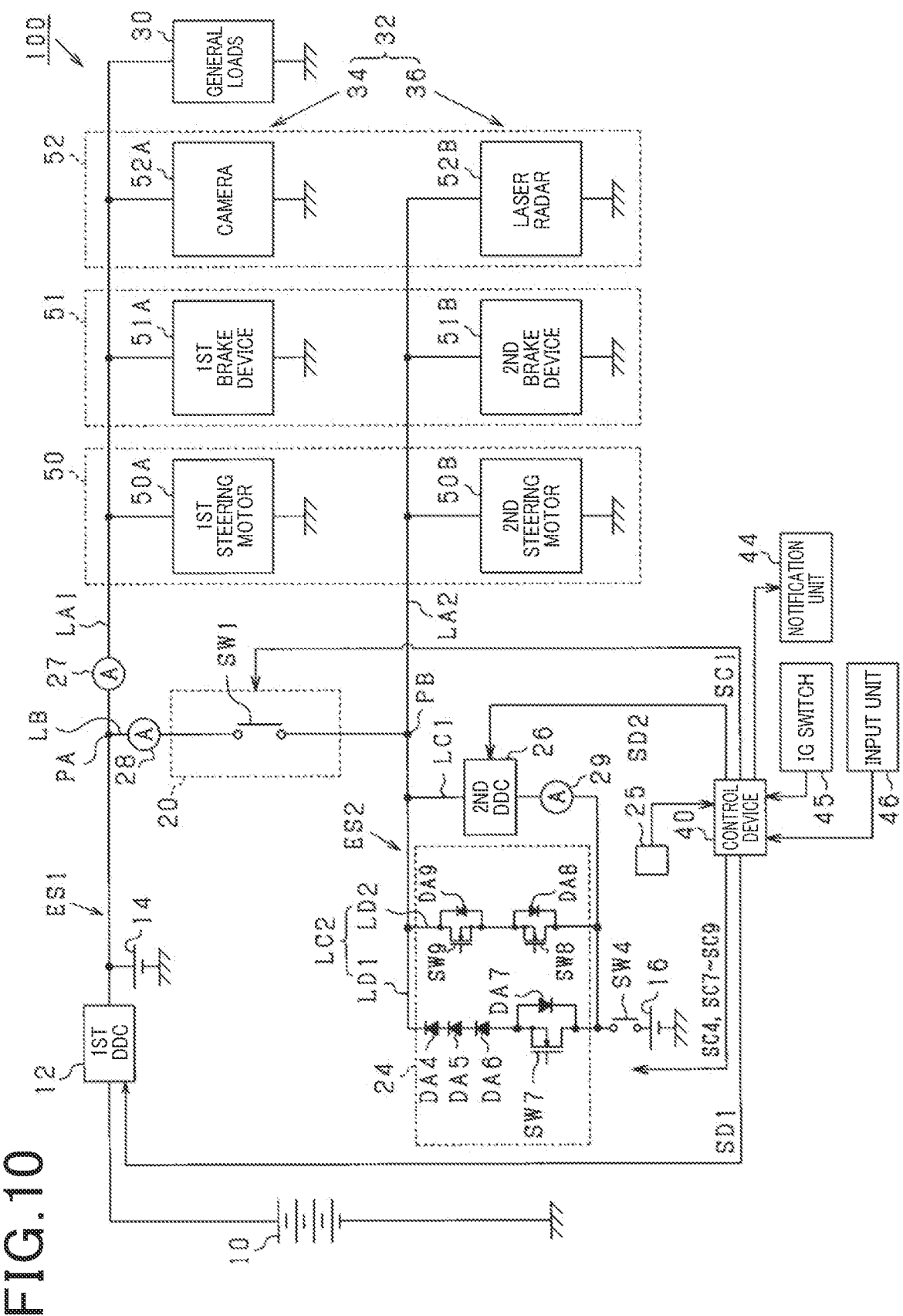
FIG. 10 is an overall configuration diagram of a power supply system according to a third embodiment.

As shown in FIG. 10, the present embodiment differs from the second embodiment in that the second path LC2 is constituted of a first restriction path LD1 and a second restriction path LD2 that are provided in parallel with each other. That is, in the present embodiment, the first path LC1, the first restriction path LD1 and the second restriction path LD2 are provided in parallel with each other between the connection point PB, at which the connection path LB is connected with the second conduction path LA2, and the second storage battery 16.

In the first restriction path LD1, there are provided fourth to sixth diodes DA4 to DA6 and a seventh switching element (hereinafter, to be simply referred to as the seventh switch) SW7. Specifically, in the first restriction path LD1, the fourth to sixth diodes DA4 to DA6 are located closer than the seventh switch SW7 to the connection path LB. On the other hand, in the second restriction path LD2, there are provided an eighth switching element (hereinafter, to be simply referred to as the eighth switch) SW8 and a ninth switching element (hereinafter, to be simply referred to as the ninth switch) SW9 that are connected in series with each other. Specifically, in the second restriction path LD2, the ninth switch SW9 is located closer than the eighth switch SW8 to the connection path LB. In the present embodiment, the discharge restriction unit 24 is configured with the fourth to sixth diodes DA4 to DA6 and the seventh to ninth switches SW7 to SW9.

The seventh switch SW7 is provided to selectively open and close the first restriction path LD1, whereas the eighth and ninth switches SW8 and SW9 are provided to selectively open and close the second restriction path LD2. In the present embodiment, each of the seventh to ninth switches SW7 to SW9 is implemented by a MOSFET. In the control process, in order to operate switching of the seventh to ninth switches SW7 to SW9, the control device 40 generates seventh to ninth switching signals SC7 to SC9 and outputs commands by the seventh to ninth switching signals SC7 to SC9 to the seventh to ninth switches SW7 to SW9.

A seventh diode DA7, which is a parasitic diode, is connected in parallel with the seventh switch SW7. Specifically, the seventh diode DA7 is arranged with its cathode on the second storage battery 16 side and its anode on the connection path LB side in the first restriction path LD1. That is, in the first restriction path LD1, the fourth to seventh diodes DA4 to DA7 are connected in series with each other such that the orientation of the seventh diode DA7 is opposite to the orientations of the fourth to sixth diodes DA4 to DA6.

Moreover, an eighth diode DA8, which is a parasitic diode, is connected in parallel with the eighth switch SW8. Similarly, a ninth diode DA9, which is also a parasitic diode, is connected in parallel with the ninth switch SW9. In the present embodiment, in the second restriction path LD2, the eighth and ninth diodes DA8 and DA9 are connected in series with each other such that the orientations of the eighth and ninth diodes DA8 and DA9 are opposite to each other. Specifically, the eighth diode DA8 is arranged with its anode on the connection path LB side and its cathode on the second storage battery 16 side. In contrast, the ninth diode DA9 is arranged with its anode on the second storage battery 16 side and its cathode on the connection path LB side.

Figure 11:
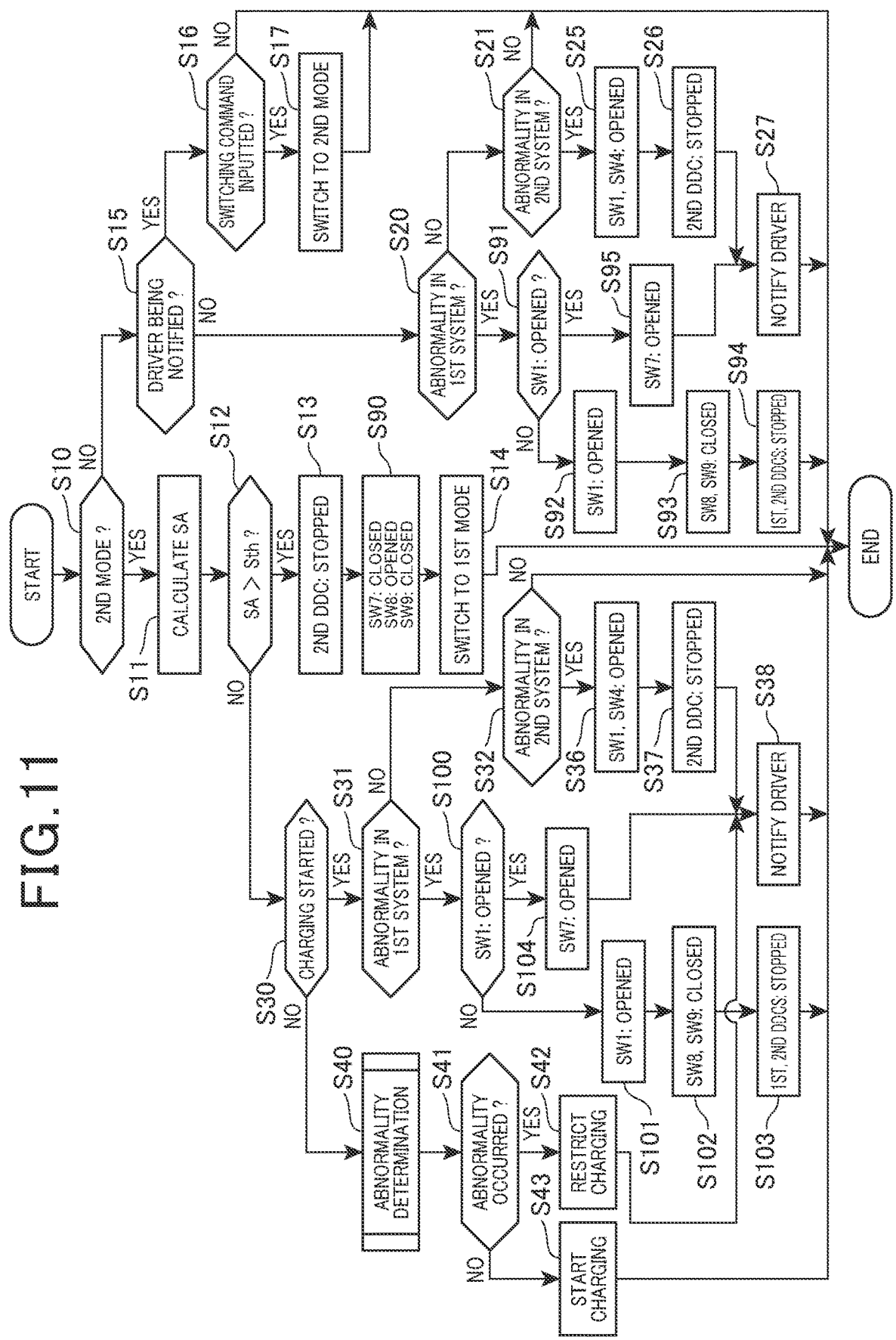
FIG. 11 is a flowchart illustrating steps of a control process according to the third embodiment.

FIG. 11 is a flowchart illustrating a control process according to the present embodiment. It should be noted that for the sake of convenience, steps in FIG. 11 identical to those in FIG. 7 are designated by the same step numbers as those in FIG. 7 and explanation thereof will be omitted hereinafter.

In the control process according to the present embodiment, if the result of the determination in step S12 is affirmative, the process proceeds to step S13. In step S13, the second converter 26 is switched to the stopped state. In subsequent step S90, the seventh and ninth switches SW7 and SW9 are closed and the eighth switch SW8 is opened. Then, the control process proceeds to step S14. That is, in the present embodiment, when the driving mode of the vehicle is switched from the second mode to the first mode, discharge of the second storage battery 16 is restricted by the fourth to sixth diodes DA4 to DA6 and the eighth switch SW8.

Moreover, in the control process according to the present embodiment, if the result of the determination in step S20 is affirmative, the process proceeds to step S91. In step S91, it is determined whether the first switch SW1 has been opened.

If the result of the determination in step S91 is negative, the control process proceeds to step S92. In step S92, the first switch SW1 is opened. In subsequent step S93, both the eighth and ninth switches SW8 and SW9 are closed. That is, in the present embodiment, when it is determined that an abnormality has occurred in the first system ES1, the first switch SW1 is opened and then both the eighth and ninth switches SW8 and SW9 are closed. In subsequent step S94, commands are outputted to switch both the first and second converters 12 and 26 from the operating state to the stopped state. Then, the control process is terminated.

In contrast, if the result of the determination in step S91 is affirmative, i.e., if steps S92 to S94 have already been performed, the control process proceeds to step S95. In step S95, the seventh switch SW7 is opened. Then, the control process proceeds to step S27. That is, in the present embodiment, the seventh switch SW7 is opened after both the eighth and ninth switches SW8 and SW9 are closed.

Furthermore, in the control process according to the present embodiment, if the result of the determination in step S31 is affirmative, steps S100 to S104 are performed. It should be noted that steps S100 to S104 are respectively identical to steps S91 to S95 described above; therefore, explanation of steps S100 to S104 will be omitted hereinafter.

Figure 12:
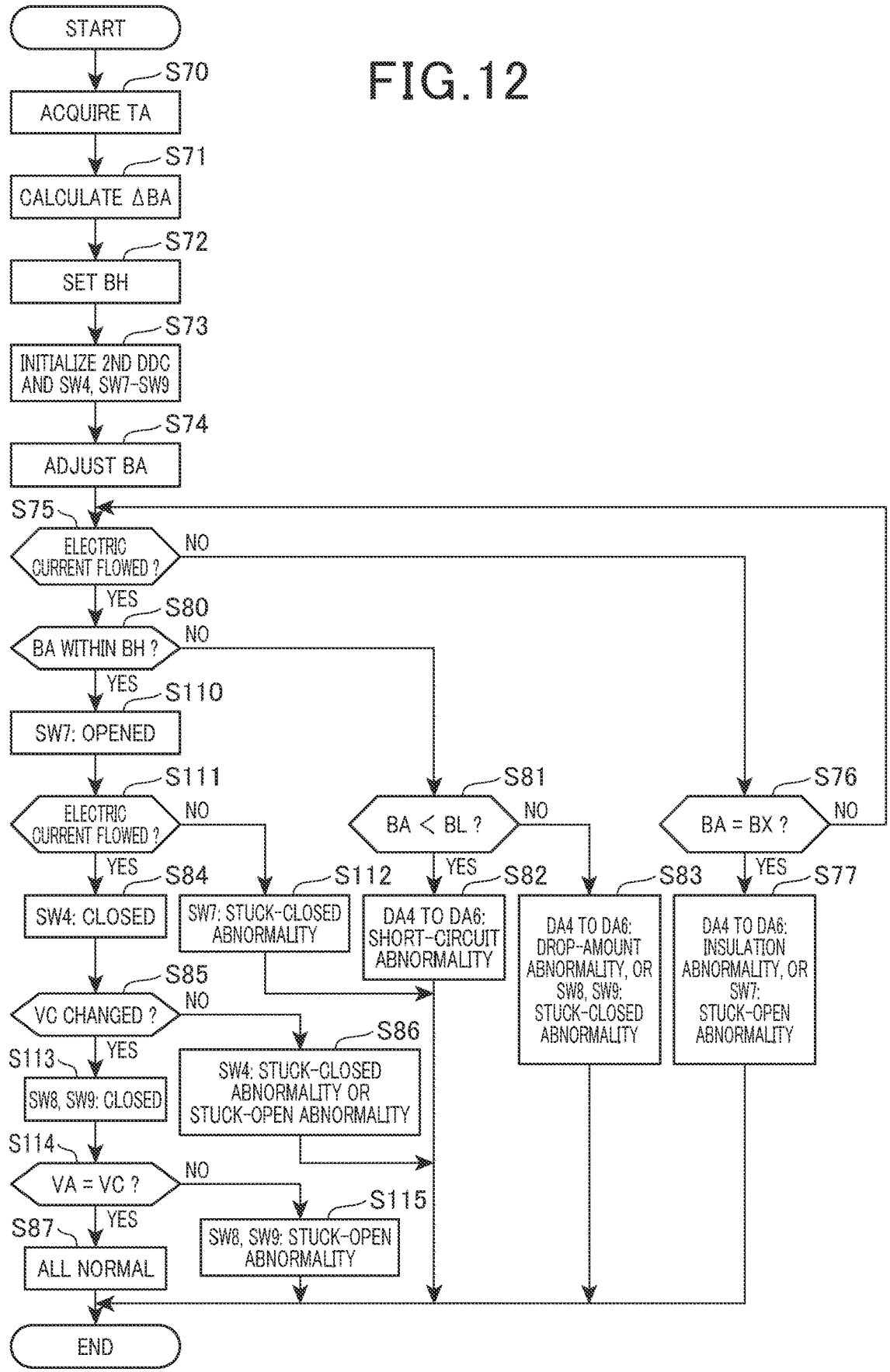
FIG. 12 is a flowchart illustrating steps of an abnormality determination process according to the third embodiment.

FIG. 12 is a flowchart illustrating an abnormality determination process according to the present embodiment. It should be noted that for the sake of convenience, steps in FIG. 12 identical to those in FIG. 8 are designated by the same step numbers as those in FIG. 8 and explanation thereof will be omitted hereinafter.

In the abnormality determination process according to the present embodiment, in step S73, the second converter 26 and the fourth and seventh to ninth switches SW4 and SW7 to SW9 are initialized. Specifically, a command is outputted to set the second converter 26 to the operating state; the seventh switch SW7 is set to the closed state; and the fourth, eighth and ninth switches SW4, SW8 and SW9 are set to the open state.

Moreover, if the result of the determination in step S76 is affirmative, the abnormality determination process proceeds to step S77. In step S77, it is determined that the insulation abnormality has occurred in the fourth to sixth diodes DA4 to DA6 or the stuck-open abnormality has occurred in the seventh switch SW7. Then, the abnormality determination process is terminated.

In addition, in the present embodiment, when the insulation abnormality has occurred in the fourth to sixth diodes DA4 to DA6 or when the stuck-open abnormality has occurred in the seventh switch SW7, no electric current flows through the third current detection unit 29 even if the boosting amount BA has been increased to the maximum boosting amount BX. Therefore, if the result of the determination in step S76 is affirmative, it is determined in step S77 that at least one of the above abnormalities has occurred.

Furthermore, if the result of the determination in step S81 is negative, the abnormality determination process proceeds to step S83. In step S83, it is determined that a drop-amount abnormality has occurred in the fourth to sixth diodes DA4 to DA6 or the stuck-closed abnormality has occurred in at least one of the eighth and ninth switches SW8 and SW9. Then, the abnormality determination process is terminated.

In addition, in the present embodiment, when a drop-amount abnormality has occurred in the fourth to sixth diodes DA4 to DA6 or when the stuck-closed abnormality has occurred in at least one of the eighth and ninth switches SW8 and SW9, electric current flows through the third current detection unit 29 even if the boosting amount BA is out of the proper range BH. Therefore, if the result of the determination in step S81 is negative, it is determined in step S83 that at least one of the above abnormalities has occurred.

Moreover, if the result of the determination in step S80 is affirmative, the abnormality determination process proceeds to step S110. In step S110, the seventh switch SW7 is opened. In subsequent step S11, it is determined whether electric current has flowed through the third current detection unit 29. If the result of the determination in step S111 is affirmative, the abnormality determination process proceeds to step S84. In contrast, if the result of the determination in step S111 is negative, the abnormality determination process proceeds to step S112. In S112, it is determined that the stuck-closed abnormality has occurred in the seventh switch SW7. Then, the abnormality determination process is terminated.

Furthermore, if the result of the determination in step S85 is affirmative, the abnormality determination process proceeds to step S113. In step S113, both the eighth and ninth switches SW8 and SW9 are closed. In subsequent step S114, it is determined whether the power supply voltage VA and the branch-point voltage VC have become equal to each other due to the closing of the eighth and ninth switches SW8 and SW9. If the result of the determination in step S114 is affirmative, the abnormality determination process proceeds to step S87. In contrast, if the result of the determination in step S114 is negative, the abnormality determination process proceeds to step S115. In S115, it is determined that the stuck-open abnormality has occurred in at least one of the eighth and ninth switches SW8 and SW9. Then, the abnormality determination process is terminated.

Referring back to FIG. 11, in step S41, it is determined whether the result of the abnormality determination performed in step S40 indicates that at least one of the fourth to sixth diodes DA4 to DA6 and the fourth and seventh to ninth switches SW4 and SW7 to SW9 has an abnormality occurring therein.

If the result of the determination in step S41 is affirmative, the control process proceeds to step S42. In step S42, charging of the second storage battery 16 by the second converter 26 is restricted. Then, the control process proceeds to step S38.

In contrast, if the result of the determination in step S41 is negative, the control process proceeds to step S43. In step S43, charging of the second storage battery 16 is started. Specifically, charging of the second storage battery 16 is started by outputting a command to set the second converter 26 to the operating state, closing the fourth switch SW4 and opening the seventh to ninth switches SW7 to SW9. Then, the control process is terminated.

According to the present embodiment described in detail above, under a low-temperature or/and high-load condition or when an abnormality has occurred in the first system ES1, discharge from the second storage battery 16 to the first and second loads 34 and 36 of the specific loads 32 can take place via the fourth to sixth diodes DA4 to DA6, thereby making it possible to supply electric power to the loads 34 and 36 in an early stage. However, in this case, due to the forward voltage drops of the fourth to sixth diodes DA4 to DA6, the voltage applied to the loads 34 and 36 is lowered. In this regard, in the present embodiment, the second restriction path LD2 is provided separately from the first restriction path LD1 in which the fourth to sixth diodes DA4 to DA6 are arranged; and the eighth and ninth switches SW8 and SW9 are arranged in the second restriction path LD2. Consequently, it becomes possible to enable supply of electric power to the loads 34 and 36 via the eighth and ninth switches SW8 and SW9 suppressing decrease in the voltage applied to the loads 34 and 36 while enabling early supply of electric power to the loads 34 and 36 via the fourth to sixth diodes DA4 to DA6 under a low-temperature or/and high-load condition or when an abnormality has occurred in the first system ES1.

Other Embodiments

The present disclosure is not limited to the above-described embodiments, and may be implemented as follows.

The loads 34 and 36 may include, for example, the following devices.

The loads 34 and 36 may include a traction motor that applies propulsion power to the vehicle and a drive circuit for the traction motor. In this case, the first and second loads 34 and 36 of one of the specific loads 32 may respectively be, for example, a three-phase permanent magnet synchronous motor and a three-phase inverter device.

The loads 34 and 36 may include an anti-lock brake system that prevents the vehicle wheels from locking up during braking. In this case, each of the first and second loads 34 and 36 of one of the specific loads 32 may be, for example, an ABS actuator that can independently regulate the brake hydraulic pressure during braking.

The loads 34 and 36 may include a cruise control system that is configured to: detect a preceding vehicle traveling ahead of the own vehicle; keep, when a preceding vehicle has been detected, the inter-vehicle distance between the own vehicle and the preceding vehicle constant; and drive, when no preceding vehicle has been detected, the own vehicle to travel at a preset speed. In this case, each of the first and second loads 34 and 36 of one of the specific loads 32 may be, for example, a millimeter-wave radar.

Each pair of the loads 34 and 36 is not necessarily constituted of a combination of two devices having the same configuration. Instead, each pair of the loads 34 and 36 may be constituted of a combination of two devices that perform equivalent functions with different configurations. Moreover, the first and second loads 34 and 36 of any of the specific loads 32 may be constituted of a single load that is supplied with electric power through both the first conduction path LA1 and the second conduction path LA2.

The voltage generator of the first power supply is not limited to the first converter 12, but may alternatively be implemented by, for example, an alternator. Furthermore, the first power supply may include only the first storage battery 14 without any voltage generator.

The rectifying element provided in the second path LC2 is not limited to the diodes, but may alternatively be implemented by at least one thyristor.

In the above-described embodiments, the second converter 26 is configured to include only the booster circuit for performing the boosting operation. However, the second converter 26 may alternatively be configured to include a step-down circuit for performing a step-down operation as well as the booster circuit for performing the boosting operation. In this case, the abnormality determination process may be performed during the step-down operation of the second converter 26.

In the above-described second embodiment, the intra-second-system current IC detected by the third current detection unit 29 is used as a parameter for determining whether an abnormality has occurred in the fourth to sixth diodes DA4 to DA6. Alternatively, a resistance value obtained by dividing the voltage difference ΔV by the intra-second-system current IC may be used as the parameter for determining whether an abnormality has occurred in the fourth to sixth diodes DA4 to DA6.

In the above-described second embodiment, the temperature characteristic of the second storage battery 16 is described as the cause of variation in the boosting amount BA. However, variation in the boosting amount BA may be caused by other factors, such as deterioration of the second storage battery 16.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A power supply system comprising:
   a first system that supplies electric power from a first power supply to a plurality of first electrical loads via a first conduction path;
   a second system that supplies electric power from a second power supply to a plurality of second electrical loads via a second conduction path; and
   a first switch provided in a connection path that connects the first and second conduction paths with each other, the first switch being an inter-system switch, wherein:
   the first power supply, which includes a first storage battery and a first converter, outputs a power supply voltage by which it is possible to drive the plurality of first electrical loads;
   the second power supply includes a second storage battery chargeable by the power supply voltage of the first power supply; and
   a first path and a second path are provided in parallel with each other between a connection point, at which the connection path is connected with the second conduction path, and the second power supply,
   the power supply system further comprising:
      a processor configured to perform control to switch the power supply system between a first state in which the inter system first switch is closed and a second state in which the first switch is open;
      a second converter provided in the first path to charge, in the first state of the power supply system, the second storage battery to a voltage higher than the power supply voltage of the first power supply with electric power supplied from the first power supply; and
      a discharge restriction unit including a second switch and a third switch, the discharge restriction unit being provided in the second path to restrict discharge of the second storage battery in the second system,
      the processor being further configured to:
         determine whether an abnormality has occurred in the discharge restriction unit; and
         perform control to restrict use of the second power supply when it is determined that an abnormality has occurred in the discharge restriction unit.

2. The power supply system as set forth in claim 1, wherein:
   the second converter is configured to perform a boosting operation for boosting the power supply voltage of the first power supply; and
   the processor is configured to acquire, during the boosting operation of the second converter, a voltage difference between a voltage at a branch point between the first and second paths on the second power supply side and a voltage at the connection point and determine, based on the acquired voltage difference, whether an abnormality has occurred in the discharge restriction unit.

3. The power supply system as set forth in claim 2, wherein:
   each of the second switch and the third switch of the discharge restriction unit are battery switches for selectively opening and closing the second path;
   the processor is configured to control the opening and closing of the battery switches; and
   during the boosting operation of the second converter, when the voltage difference is smaller than a predetermined first threshold with the battery switches being controlled so as to be opened or when the voltage difference is larger than a predetermined second threshold with the battery switches being controlled so as to be closed, the processor determines that an abnormality has occurred in the discharge restriction unit.

4. The power supply system as set forth in claim 1, wherein:
   the discharge restriction unit includes a rectifying element that restricts flow of electric current from the connection point to the second storage battery in the second path and causes a predetermined reference voltage difference between a voltage of the second storage battery and the power supply voltage;
   the processor is configured to adjust a boosting amount of the second converter up to a value larger than a corresponding value that corresponds to the reference voltage difference; and
   when electric current flows through the rectifying element with the boosting amount being smaller than the corresponding value or when no electric current flows through the rectifying element with the boosting amount being larger than the corresponding value, the processor determines that an abnormality has occurred in the second switch and the third switch.

5. The power supply system as set forth in claim 4, wherein
   the processor is configured to acquire variation information indicating a degree of variation in the boosting amount and vary the corresponding value according to the acquired variation information.

6. The power supply system as set forth in claim 1, further comprising:
a fourth switch that is provided, in the second conduction path, between the second power supply and a branch point between the first and second paths on the second power supply side, the fourth switch being an intra-system switch, wherein
the processor is configured to determine, with the intra-system switch being in an open state, whether an abnormality has occurred in the second switch and the third switch.

7. The power supply system as set forth in claim 6, wherein:
the processor is configured to:
control the opening and closing of the intra-system switch; and
determine, based on whether there is a change in a voltage at the branch point when the intra-system switch is switched from the open state to a closed state, whether an abnormality has occurred in the intra-system switch.

8. The power supply system as set forth in claim 1, wherein:
the power supply system is installed in a vehicle;
each of the plurality of first electrical loads and the plurality of second electrical loads performs a driver assistance function of the vehicle as well as at least one function necessary for driving of the vehicle;
a driving mode of the vehicle is switchable between a first mode using the driver assistance function and a second mode not using the driver assistance function; and
the processor is configured to permit the driving mode of the vehicle to be switched from the second mode to the first mode on condition that it is determined that no abnormality has occurred in the discharge restriction unit.

* * * * *